United States Patent

Le Thierry D'Ennequin et al.

(10) Patent No.: US 9,844,026 B2
(45) Date of Patent: Dec. 12, 2017

(54) COMMUNICATION SYSTEM

(71) Applicant: NEC Corporation, Tokyo (JP)

(72) Inventors: Christophe Le Thierry D'Ennequin, Berkshire (GB); Dorin Panaitopol, Berkshire (GB); Benoit Lecroart, Berkshire (GB)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/773,995

(22) PCT Filed: Oct. 27, 2014

(86) PCT No.: PCT/JP2014/005419
§ 371 (c)(1),
(2) Date: Sep. 9, 2015

(87) PCT Pub. No.: WO2015/064074
PCT Pub. Date: May 7, 2015

(65) Prior Publication Data
US 2016/0234806 A1     Aug. 11, 2016

(30) Foreign Application Priority Data
Oct. 30, 2013  (GB) .................................. 1319196.0

(51) Int. Cl.
*H04W 4/06* (2009.01)
*H04W 72/00* (2009.01)
(Continued)

(52) U.S. Cl.
CPC ....... *H04W 72/005* (2013.01); *H04L 67/2838* (2013.01); *H04W 4/06* (2013.01);
(Continued)

(58) Field of Classification Search
None
See application file for complete search history.

(56) References Cited

U.S. PATENT DOCUMENTS

2008/0247372 A1   10/2008   Chion et al.
2011/0312331 A1*  12/2011   Hakola ............... H04W 72/085
                                                 455/452.2

(Continued)

FOREIGN PATENT DOCUMENTS

EP        2381705 A1     10/2011
JP     2013-102334 A      5/2013
(Continued)

OTHER PUBLICATIONS

International Search Report, Corresponding to PCT/JP2014/005419, dated Jan. 20, 2015, 2 pages.
(Continued)

*Primary Examiner* — Chi H Pham
*Assistant Examiner* — Soon-Dong D Hyun
(74) *Attorney, Agent, or Firm* — Wilmer Cutler Pickering Hale and Dorr LLP

(57) ABSTRACT

A communication system is disclosed in which a relay communication device identifies a service to be received by at least one other communication device and also identifies the at least one communication device. The relay communication device maintains a mapping between services and the communication device(s) that need to receive that service. The relaying communication device receives service data using a broadcast/multicast bearer and forwards, using a respective device-to-device bearer, the service data to each communication device for which a respective mapping to that particular service is maintained.

5 Claims, 11 Drawing Sheets

(51) Int. Cl.
*H04W 76/00* (2009.01)
*H04W 76/02* (2009.01)
*H04W 88/06* (2009.01)
*H04W 88/04* (2009.01)
*H04L 29/08* (2006.01)
*H04L 29/12* (2006.01)

(52) U.S. Cl.
CPC ....... *H04W 76/002* (2013.01); *H04W 76/023* (2013.01); *H04L 61/35* (2013.01); *H04L 67/16* (2013.01); *H04W 88/04* (2013.01); *H04W 88/06* (2013.01)

(56) References Cited

U.S. PATENT DOCUMENTS

| | | | |
|---|---|---|---|
| 2012/0083283 A1* | 4/2012 | Phan | H04W 72/048 455/450 |
| 2012/0129540 A1* | 5/2012 | Hakola | H04W 72/042 455/450 |
| 2013/0016646 A1 | 1/2013 | Chang et al. | |
| 2013/0100876 A1* | 4/2013 | He | H04W 12/08 370/315 |
| 2013/0188522 A1* | 7/2013 | Chu | H04W 72/1252 370/255 |
| 2013/0223398 A1* | 8/2013 | Li | H04W 72/085 370/329 |
| 2014/0056230 A1* | 2/2014 | Dimou | H04W 72/048 370/329 |
| 2015/0195677 A1* | 7/2015 | Kondo | H04W 4/06 455/404.2 |
| 2016/0150484 A1* | 5/2016 | Seo | H04W 52/242 455/522 |

FOREIGN PATENT DOCUMENTS

| | | |
|---|---|---|
| KR | 10-2010-0069482 A | 6/2010 |
| WO | WO-2010/073403 A1 | 7/2010 |

OTHER PUBLICATIONS

United Kingdom Intellectual Property Office Search Report, corresponding to Application No. GB1319196.0, dated Mar. 18, 2014, 7 pp.

3GPP SP-120456, TCCA—Critical Communications Association, Critical Communications Broadband Group (CCBG), Liaison Statement, "Additional Information: Group Communications & Proximity-based Services," Jul. 27, 2012, 2 pages.

3GPP TSG-RAN WG2 #83, R2-132447, Qualcomm Incorporated, "Discussion on D2D Communications," Aug. 19-23, 2013, Barcelona Spain, 6 pp.

3GPP TR 23.703 V0.7.1, Technical Report, "3rd Generation Partnership Project; Technical Specification Group Services and System Aspects; Study on Architecture Enhancements to Support Proximity-based Services (ProSe)," ( Release 12), Sep. 2013, 32 pp.

3GPP TR 23.768 V0.4.1, "3rd Generation Partnership Project; Technical Specification Group Services and System Aspects; Study on Architecture Enhancements to Support Group Communication System Enablers for LTE (GCSE_LTE)," (Release 12), Technical Report (2013-109), 2013, 53 pages.

3GPP TR 22.803 V12.2.0, Technical Report, "3rd Generation Partnership Project; Technical Specification Group Services and System Aspects; Feasibility Study for Proximity Services (ProSE)," Release 12, (Jun. 2013) 45 pp.

\* cited by examiner

COMMUNICATION SYSTEM

CROSS-REFERENCE TO RELATED APPLICATIONS

The present application is a national stage application of International Application No. PCT/W2014/005419 entitled "Communication System," filed on Oct. 27 2014, which claims the benefit of priority from Great Britain Patent Application No. 1319196.0, filed Oct. 30, 2013, the disclosures of which are incorporated herein in their entirety by reference thereto.

TECHNICAL FIELD

The present invention relates to a communication system and to parts and methods thereof. The invention has particular but not exclusive relevance to wireless communication systems and devices thereof operating according to the 3GPP standards or equivalents or derivatives thereof.

BACKGROUND ART

Wireless communication systems enable users of User Equipment (UE) to communicate with other such users via one of a number of base stations and via one or a number of core networks. Typically, the UEs are mobile terminals, such as mobile (cellular) telephones and the like, although the term UE may also refer to generally stationary communication devices, such as laptop computers, web browsers, machine-type communication devices, and the like. In the following description the term mobile communication device is used, which is intended to cover any type of such user equipment (mobile and stationary).

In an active or connected state a mobile communication device is registered with the network and has a Radio Resource Control (RRC) connection with a base station so that the network knows to which base station (or cell thereof) the mobile communication device belongs and can transmit data to and receive data from the mobile communication device. Each mobile communication device also establishes a default Evolved Packet System (EPS) Bearer (i.e. an end-to-end dedicated communication path) from the mobile communication device to an endpoint beyond the base station, typically a gateway (such as a packet data network gateway—'PDN-GW' or 'P-GW'—or the like), in the Enhanced Packet Core (EPC) network, or core network for short. An EPS Bearer, which is specific to the mobile communication device, defines a transmission path through the network and assigns an IP address to the mobile communication device, at which it can be reached by other communication devices, such as another mobile communication device. When data is sent to the mobile communication device via such an EPS bearer or via another dedicated bearer, this is referred to as a unicast transmission.

However, in order to reduce the amount of data that needs to be sent over the air interface (which has limited resources) when a plurality of mobile communication devices are receiving the same data (e.g. popular content, such mobile TV programs and the like), broadcast and/or multicast services may also be used instead of separate unicast transmission for each mobile communication device. In this case, e.g. when a group of mobile communication devices are interested in the same content, rather than using each mobile communication device's dedicated bearer, the network sends the data in a synchronised manner to the whole group in a single broadcast or multicast transmission, using a common broadcast/multicast bearer provided between the network and the mobile communication devices of that group.

As part of the Long Term Evolution (LTE) of UTRAN (UMTS Terrestrial Radio Access Network) referred to as E-UTRAN, proximity-based services (ProSe) have been introduced, which make use of direct device-to-device (D2D) communication bearers directly between compatible mobile communication devices rather than indirect bearers provided from one mobile communication device, via a base station and the core network, to another mobile communication device (e.g. a pair of EPS bearers and/or broadcast/multicast bearers). Thus, when a ProSe enabled mobile communication device is within the transmission range of (or served by the same base station as) another ProSe mobile communication device, they can communicate user data without the need to use core network resources. Such services can be achieved by establishing a special, 'D2D', bearer between the mobile communication devices in direct communication (or communication routed via their base station only) instead of their default or other conventional EPS bearers (which might be still used for other types of communications). This direct or locally routed communication could result in better utilization of the available resources, especially on the radio interface, where these are limited. Details of the ProSe functionality have been specified in the 3GPP Technical Report TR 22.803 document, the contents of which are incorporated herein by reference.

More recently the provision of a relay functionality, in the mobile communication device, using the ProSe functionality has been proposed to allow one mobile communication device (referred to as a 'UE-Relay' or 'UE-R') to relay the signalling and the user data for another mobile communication device to and from the network, even if the other mobile communication device is not located within the network's coverage. In this case, the relayed mobile communication device can communicate with the network (both user plane and control plane data) via the UE-R thus accessing the same services as if the relayed mobile communication device were served by a base station of the network.

Public safety communities (e.g. emergency services) that are committed to using LTE are also interested in such proximity-based services, especially in situations when network coverage is limited (see e.g. 3GPP SP-120456 (MoU between TETRA & Critical Communications Association (TCCA) & the National Public Safety Telecommunications Council), and 3GPP S1-121247 (TCCA)). Thus ProSe allows LTE network operators to achieve economy of scale, i.e. that the same network and/or the same technology can be used for both public safety and non-public-safety services.

In order to be able to benefit from ProSe services, a ProSe enabled mobile communication device performs a so-called discovery procedure (which can be done with or without network assistance/coverage). As part of this discovery procedure, each ProSe enabled mobile communication device transmits (e.g. periodically) a beacon for announcing itself to other such mobile communication devices in its proximity, and also listens for beacon transmissions by other devices. After two (or more) mobile communication devices have mutually discovered each other (e.g. they have received the other mobile communication device's beacon), they are able to start a ProSe communication session with each other.

The so-called Multimedia Broadcast/Multicast Service (MBMS) and the enhanced MBMS (eMBMS) technologies may be used for the simultaneous broadcast and/or multicast of content to groups of mobile communication devices. In a typical (e)MBMS use case, users subscribe to a service (e.g. mobile TV or the like) that they wish to receive on their mobile communication devices. Each mobile communication device is assigned to a group (or groups) in dependence on the user's subscription(s), and receives associated broadcast and/or multicast content from the network in the form of a synchronised transmission via its serving base station or via multiple base stations at the same time (e.g. inside the same Multicast-Broadcast Single-Frequency Network (MB-SFN) Area). The main benefit of (e)MBMS is that instead of transmitting the content to each mobile communication device via its individual associated EPS bearer (which might add up to hundreds or thousands of EPS bearers in the case of popular content), in (e)MBMS data is transmitted only once and at the same time to all mobile communication devices within any one group, via the base station(s) serving mobile communication devices belonging to that group. This approach beneficially reduces the congestion in the core network and/or the resources required by the UEs in the radio access network (RAN).

CITATION LIST

Non Patent Literature

NPL 1: 3GPP Technical Report TR 22.803
NPL 2: 3GPP SP-120456
NPL 3: 3GPP TR 23.768

SUMMARY OF INVENTION

Technical Problem

However, in order to receive content using (e)MBMS, a mobile communication device needs to be within the coverage of a base station (which is sometimes referred to as 'within (e)MBMS coverage'). Relaying of broadcast/multicast transmissions via a UE-R is not possible because the UE-R needs to receive (from the base station) any broadcast/multicast data before it can transmit (i.e. relay) that data to a mobile communication device subscribing to the associated broadcast/multicast transmission. This type of (i.e. UE-R based) relaying would thus inhibit the required synchronisation of the broadcast/multicast transmissions and would also introduce interference to other UEs being served by the base station. Therefore, in order to receive the data that is multicast/broadcast to mobile communication devices in the range of the base station, out-of-range mobile communication devices that are accessing the network via a UE-R only, must receive that data via the out-of-range mobile communication devices' respective (dedicated) unicast bearers, such as their associated EPS bearers and/or other dedicated connections. This makes inefficient use of communication and processing resources at the various communication entities that form part of the communication path that delivers the data.

Accordingly, preferred embodiments of the present invention aim to provide methods and apparatus which overcome or at least partially alleviate at least one of the above issues.

Solution to Problem

In one aspect, the invention provides a communication device for facilitating the provision of at least one service in a communication network, the communication device comprising: means for communicating with a base station of said communication network and with a plurality of other communication devices, wherein said communicating means is operable to: i) communicate with the base station over a first interface; ii) communicate with the plurality of other communication devices over a second interface; iii) receive, via at least one of said first and second interfaces information identifying each service that a respective user of a corresponding communication device, of said plurality of other communication devices, is interested in receiving, and information identifying the corresponding communication device of that user; and iv) receive, via said first interface, service data for at least one related service, wherein the service data is provided using a broadcast/multicast bearer. The communication device comprises means for maintaining, for each service identified by said received information, a mapping between the identified service and each corresponding communication device of a user that is interested in receiving that service. The communicating means is operable to forward service data, for a particular service, received via the first interface, to each communication device for which said maintaining means maintains a respective mapping to that particular service.

The communicating means might be operable to receive, said information identifying each service that a respective user of a corresponding communication device is interested in receiving, in a request for setting up a device-to-device bearer between said communication device and said corresponding communication device (e.g. a 'D2D Bearer Request' message and/or an 'RC Connection Reconfiguration' message).

The communicating means might be operable to receive said request, over said second interface and wherein said maintaining means is operable to extract information for forming said mapping from said request received over said second interface.

The communicating means might be operable to receive said request, over said first interface and wherein said maintaining means is operable to extract information for forming said mapping from said request received over said first interface. In this case, the communicating means might be operable to receive said request after receiving a message, carrying said information identifying each service that a respective user of a corresponding communication device is interested in receiving, and forwarding (e.g. transparently) the received message to said base station over said first interface. The message might comprise a request from a communication device to register that communication device with a network node configured to provide a service that a user of that communication device is interested in receiving. The message might include information identifying said communication device.

The request received over the first interface might be an 'RRC Connection Reconfiguration' message.

The information identifying each service that a respective user of a corresponding communication device is interested in receiving might comprise at least one of: a Temporary Mobile Group Identity (TMGI) associated with the group service; a multicast address associated with the group service; and a port number associated with the group service.

The maintaining means might be operable to maintain for each service identified by said received information a mapping between information identifying said service and a respective communication bearer associated with each corresponding communication device of a user that is interested in receiving that service.

The mapping might comprise at least one traffic flow template (e.g. a device-to-device, D2D, traffic flow template) for each corresponding communication device of a user that is interested in receiving that service.

The communicating means might be operable to communicate over said second interface using a different communication technology than a communication technology used over said first interface. For example, the different communication technology might comprise at least one of: a WLAN, a Wi-Fi, a FlashLinQ, a WiMAX, a Bluetooth, a BLE, and a ZigBee communication technology.

The service might comprise a group service. The broadcast/multicast bearer might comprise a Multimedia Broadcast/Multicast Service (MBMS) bearer and/or an Enhanced Multimedia Broadcast/Multicast Service (eMBMS) bearer.

The communicating means might be operable to communicate with at least one corresponding communication device of a user that is interested in receiving that service using a broadcast/multicast bearer over said second interface. The communication device might be configured as a UE-Relay.

In one aspect, the invention provides a communication device for accessing at least one service provided in a communication network, whilst said communication device is located outside of a coverage area of a base station of said communication network, the communication device comprising: means for communicating with another communication device that is located inside said coverage area of said base station of said communication network; and means for identifying a service, that a user of said communication device is interested in receiving, and that is provided by said communication network using a broadcast/multicast bearer; wherein said communicating means is operable: to transmit, to said other communication device, information identifying the service that a user of said communication device is interested in receiving; to establish an end of a bearer between said communication device and said other communication device for receiving service data, forwarded by said other communication device, relating to said identified service; and to receive, over said requested bearer when established, service data relating to said identified service that is provided by said communication network using a broadcast/multicast bearer.

The communicating means might be operable to transmit, said information identifying the service that a user of said communication device is interested in receiving, in a request for setting up a device-to-device bearer between said communication device and said other communication device. In this case, the communicating means might be operable to send said request for setting up a device-to-device bearer between said communication device and said other communication device to a core network node (e.g. an MME), via said other communication node.

The request for setting up a device-to-device bearer between said communication device and said other communication device might comprise information identifying said other communication device.

The communicating means might be operable to transmit, said information identifying the service that a user of said communication device is interested in receiving, in a request to register said communication device with a network node configured to provide said service that a user of said communication device is interested in receiving. In this case, the request to register said communication device with a network node might comprise an indication that broadcast/multicast services are available for said communication device. The request to register said communication device with a network node might comprise said information identifying said other communication device.

The information identifying a service might comprise at least one of: a Temporary Mobile Group Identity (TMGI) associated with the service; a multicast address associated with the service; and a port number associated with the service.

The communication device might comprise at least one of: user equipment (UE), mobile telephone, smartphone, personal computer, laptop computer, tablet computer, in accordance with the Long Term Evolution (LTE) set of standards. The communicating means might be operable to communicate, with said other communication device, using at least one of: an LTE, a WLAN, a Wi-Fi, a FlashLinQ, a WiMAX, a Bluetooth, a BLE, and a ZigBee communication technology.

In one aspect, the invention provides a network apparatus for facilitating the provision of at least one service in a communication network, the network apparatus comprising: means for communicating with a communication device via a relaying communication device, said communicating means operable to: receive information identifying: i) at least one service that a user of said communication device is interested in receiving; ii) said relaying communication device; and iii) that broadcast/multicast services are available via said relaying communication device; send, towards said relaying communication node, a request for setting up a bearer between said communication device and said relaying communication device for forwarding service data, provided to said relaying communication device on a broadcast/multicast bearer, relating to at least one service that a user of said communication device is interested in receiving, based on said received information; and send, when said requested bearer is established, to said relaying communication device, over said broadcast/multicast bearer, service data relating to said at least one service that a user of said communication device is interested in receiving.

The communicating means might be operable to receive said information in at least one message for registering said communication device with said network apparatus.

The request for setting up a bearer between said communication device and said relaying communication device might comprise a request for setting up a device-to-device (D2D) bearer between said communication device and said relaying communication device. The request for setting up a bearer between said communication device and said relaying communication device might comprise said information identifying said at least one service that a user of said communication device is interested in receiving. The at least one service that a user of said communication device is interested in receiving might comprise a group service.

The network apparatus might comprise a Group Communication System Enabler Application Server (GCSE AS).

In one aspect, the invention provides a network apparatus for facilitating the provision of at least one service in a communication network, the network apparatus comprising: means for communicating with a communication device via a relaying communication device and with an application server configured to provide broadcast/multicast services, wherein said communicating means is operable to: receive a request for setting up a bearer, between said communication device and said relaying communication device, for forwarding service data, provided to said relaying communication device on a broadcast/multicast bearer, relating to at least one service that a user of said communication device is interested in receiving, wherein said request comprises information identifying: i) at least one service that a user of said communication device is interested in receiving; ii) said relaying communication device; and iii) that broadcast/ multicast services are available via said relaying communication device; and send, to a base station serving said relaying communication device, a request that the base station facilitates the setting up of said bearer between said communication device and said relaying communication device, based on said received information.

The received request for setting up said bearer between said communication device and said relaying communication device might comprise a request for setting up a device-to-device (D2D) bearer between said communication device and said relaying communication device. The request sent to said base station might comprise an 'E-RAB Setup Request' and/or an 'E-RAB Modify Request'. The request sent to said base station might comprise said information identifying said at least one service that a user of said communication device is interested in receiving.

The communicating means might be operable to receive said request for setting up said bearer between said communication device and said relaying communication device from said application server or from said communication device (via said relaying communication device).

The network apparatus might comprise a core network node. For example, the network apparatus might comprise a Mobility Management Entity (MME).

In one aspect, the invention provides a base station for facilitating the provision of at least one service in a communication network, the base station comprising: means for communicating with a communication device via a relaying communication device and with a core network entity serving said communication device, wherein said communicating means is operable to: receive a request for setting up a bearer between said communication device and said relaying communication device, said request comprising information identifying: i) at least one service that a user of said communication device is interested in receiving; ii) said communication device; and iii) said relaying communication device; and send, to said relaying communication device, a request for setting up a bearer between said communication device and said relaying communication device for forwarding service data, provided to said relaying communication device on a broadcast/multicast bearer, relating to at least one service that a user of said communication device is interested in receiving, based on said received information.

The request received from said core network entity might comprise an 'E-RAB Setup Request' and/or an 'E-RAB Modify Request'. The core network entity might comprise a Mobility Management Entity (MME).

The request sent to said relaying communication device might comprise an 'RRC Connection Reconfiguration' message. The request sent to said relaying communication device might comprise information identifying said at least one service that a user of said communication device is interested in receiving.

The base station might comprise a base station in accordance with the Long Term Evolution (LTE) set of standards.

In one aspect, the invention provides a communication system comprising the above described communication devices. The communication system might also comprise the above described network apparatus and a base station.

In one aspect, the invention provides a communication device for facilitating the provision of at least one service in a communication network, the communication device comprising a processor and a transceiver, said transceiver being configured to communicate with a base station of said communication network and with a plurality of other communication devices, wherein said transceiver is operable to: i) communicate with the base station over a first interface; ii) communicate with the plurality of other communication devices over a second interface; iii) receive, via at least one of said first and second interfaces information identifying each service that a respective user of a corresponding communication device, of said plurality of other communication devices, is interested in receiving, and information identifying the corresponding communication device of that user; and iv) receive, via said first interface, service data for at least one related service, wherein the service data is provided using a broadcast/multicast bearer. The processor is operable to maintain, for each service identified by said received information, a mapping between the identified service and each corresponding communication device of a user that is interested in receiving that service. The transceiver is operable to forward service data, for a particular service, received via the first interface, to each communication device for which said processor maintains a respective mapping to that particular service.

In one aspect, the invention provides a communication device for accessing at least one service provided in a communication network, whilst said communication device is located outside of a coverage area of a base station of said communication network, the communication device comprising a processor and a transceiver, wherein said transceiver is operable to communicate with another communication device that is located inside said coverage area of said base station of said communication network; said processor is operable to identify a service, that a user of said communication device is interested in receiving, and that is provided by said communication network using a broadcast/multicast bearer; and said transceiver is operable: i) to transmit, to said other communication device, information identifying the service that a user of said communication device is interested in receiving; ii) to establish an end of a bearer between said communication device and said other communication device for receiving service data, forwarded by said other communication device, relating to said identified service; and iii) to receive, over said requested bearer when established, service data relating to said identified service that is provided by said communication network using a broadcast/multicast bearer.

In one aspect, the invention provides a network apparatus for facilitating the provision of at least one service in a communication network, the network apparatus comprising a transceiver for communicating with a communication device via a relaying communication device, wherein said transceiver is operable to receive information identifying: i) at least one service that a user of said communication device is interested in receiving; ii) said relaying communication device; and iii) that broadcast/multicast services are available via said relaying communication device. The transceiver is operable to send, towards said relaying communication node, a request for setting up a bearer between said communication device and said relaying communication device for forwarding service data, provided to said relaying communication device on a broadcast/multicast bearer, relating to at least one service that a user of said communication device is interested in receiving, based on said received information; and send, when said requested bearer is established, to said relaying communication device, over said broadcast/multicast bearer, service data relating to said at least one service that a user of said communication device is interested in receiving.

In one aspect, the invention provides a network apparatus for facilitating the provision of at least one service in a communication network, the network apparatus comprising a transceiver for communicating with a communication device via a relaying communication device and with an application server configured to provide broadcast/multicast services, wherein said transceiver is operable to receive a request for setting up a bearer, between said communication device and said relaying communication device, for forwarding service data, provided to said relaying communication device on a broadcast/multicast bearer, relating to at least one service that a user of said communication device is interested in receiving, wherein said request comprises information identifying: i) at least one service that a user of said communication device is interested in receiving; ii) said relaying communication device; and iii) that broadcast/multicast services are available via said relaying communication device. The transceiver is operable to send, to a base station serving said relaying communication device, a request that the base station facilitates the setting up of said bearer between said communication device and said relaying communication device, based on said received information.

In one aspect, the invention provides a base station for facilitating the provision of at least one service in a communication network, the base station comprising a transceiver for communicating with a communication device via a relaying communication device and with a core network entity serving said communication device, wherein said transceiver is operable to receive a request for setting up a bearer between said communication device and said relaying communication device, said request comprising information identifying: i) at least one service that a user of said communication device is interested in receiving; ii) said communication device; and iii) said relaying communication device. The transceiver is operable to send, to said relaying communication device, a request for setting up a bearer between said communication device and said relaying communication device for forwarding service data, provided to said relaying communication device on a broadcast/multicast bearer, relating to at least one service that a user of said communication device is interested in receiving, based on said received information.

In one aspect, the invention provides a method performed by a communication device for facilitating the provision of at least one service in a communication network, the communication device comprising means for communicating: i) with a base station of said communication network over a first interface; and ii) with a plurality of other communication devices over a second interface, the method comprising: receiving, via at least one of said first and second interfaces information identifying each service that a respective user of a corresponding communication device, of said plurality of other communication devices, is interested in receiving, and information identifying the corresponding communication device of that user; receiving, via said first interface, service data for at least one related service, wherein the service data is provided using a broadcast/multicast bearer; maintaining, for each service identified by said received information, a mapping between the identified service and each corresponding communication device of a user that is interested in receiving that service; and forwarding service data, for a particular service, received via the first interface, to each communication device for which said processor maintains a respective mapping to that particular service.

In one aspect, the invention provides a method performed by a communication device for accessing at least one service provided in a communication network, whilst said communication device is located outside of a coverage area of a base station of said communication network, the method comprising: communicating with another communication device that is located inside said coverage area of said base station of said communication network; identifying a service, that a user of said communication device is interested in receiving, and that is provided by said communication network using a broadcast/multicast bearer; transmitting, to said other communication device, information identifying the service that a user of said communication device is interested in receiving; establishing an end of a bearer between said communication device and said other communication device for receiving service data, forwarded by said other communication device, relating to said identified service; and receiving, over said requested bearer when established, service data relating to said identified service that is provided by said communication network using a broadcast/multicast bearer.

In one aspect, the invention provides a method performed by a network apparatus for facilitating the provision of at least one service in a communication network, the network apparatus comprising means for communicating with a communication device via a relaying communication device, the method comprising: receiving information identifying: i) at least one service that a user of said communication device is interested in receiving; ii) said relaying communication device; and iii) that broadcast/multicast services are available via said relaying communication device; sending, towards said relaying communication node, a request for setting up a bearer between said communication device and said relaying communication device for forwarding service data, provided to said relaying communication device on a broadcast/multicast bearer, relating to at least one service that a user of said communication device is interested in receiving, based on said received information; and sending, when said requested bearer is established, to said relaying communication device, over said broadcast/multicast bearer, service data relating to said at least one service that a user of said communication device is interested in receiving.

In one aspect, the invention provides a method performed by a network apparatus for facilitating the provision of at least one service in a communication network, the network apparatus comprising means for communicating with a communication device via a relaying communication device and with an application server configured to provide broadcast/multicast services, the method comprising: receiving a request for setting up a bearer, between said communication device and said relaying communication device, for forwarding service data, provided to said relaying communication device on a broadcast/multicast bearer, relating to at least one service that a user of said communication device is interested in receiving, wherein said request comprises information identifying: i) at least one service that a user of said communication device is interested in receiving; ii) said relaying communication device; and iii) that broadcast/multicast services are available via said relaying communication device; and sending, to a base station serving said relaying communication device, a request that the base station facilitates the setting up of said bearer between said communication device and said relaying communication device, based on said received information.

In one aspect, the invention provides a method performed by a base station for facilitating the provision of at least one service in a communication network, the base station comprising means for communicating with a communication device via a relaying communication device and with a core network entity serving said communication device, the method comprising: receiving a request for setting up a bearer between said communication device and said relaying communication device, said request comprising information identifying: i) at least one service that a user of said communication device is interested in receiving; ii) said communication device; and iii) said relaying communication device; and sending, to said relaying communication device, a request for setting up a bearer between said communication device and said relaying communication device for forwarding service data, provided to said relaying communication device on a broadcast/multicast bearer, relating to at least one service that a user of said communication device is interested in receiving, based on said received information.

Aspects of the invention extend to computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

Advantageous Effects of Invention

The present invention enables efficient use of communication and processing resources at the various communication entities that form part of the communication path that delivers the data.

BRIEF DESCRIPTION OF DRAWINGS

Embodiments of the invention will now be described, by way of example, with reference to the accompanying drawings, in which.

DESCRIPTION OF EMBODIMENTS

Figure 1:
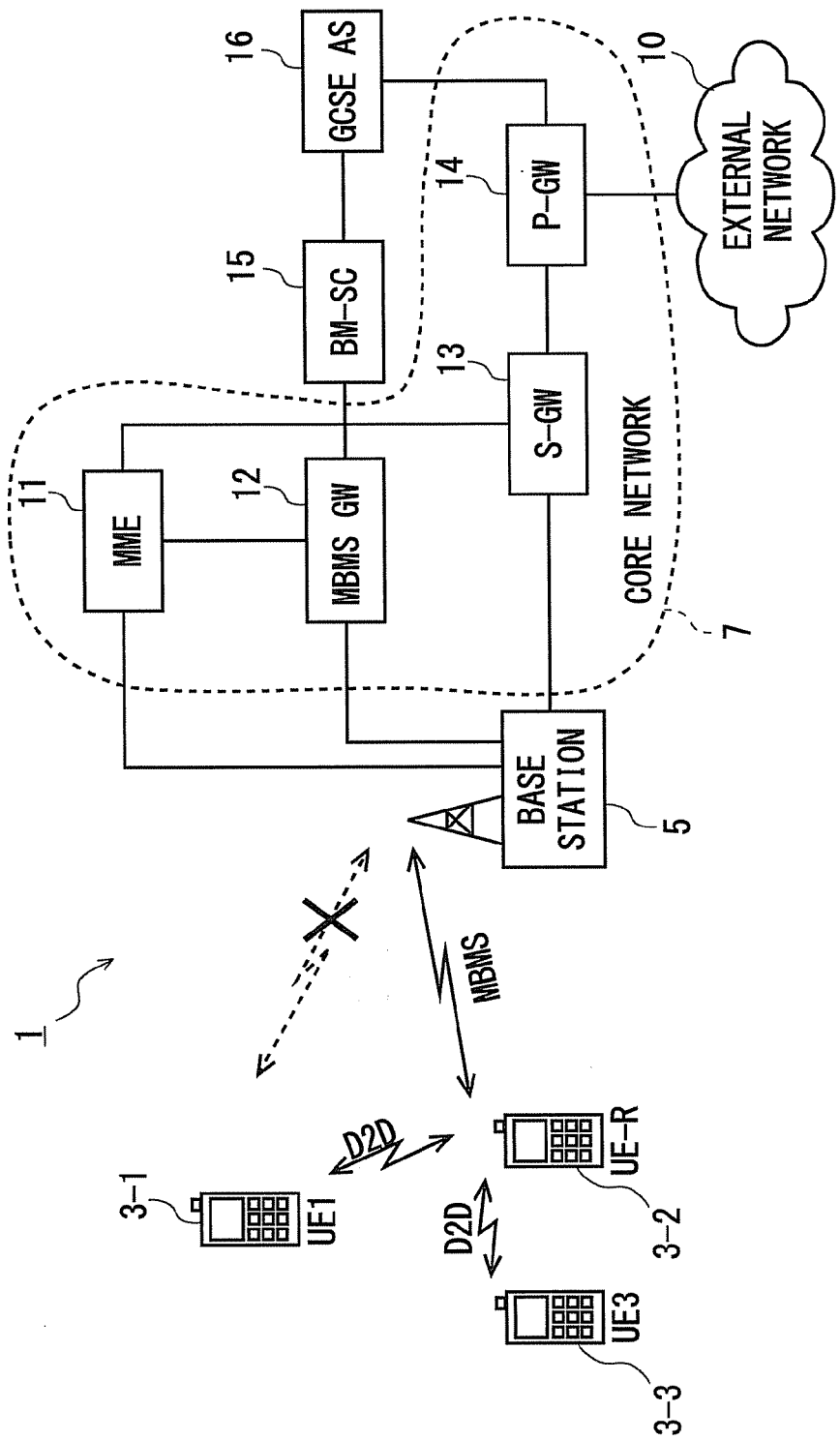
FIG. 1 illustrates schematically a cellular communication system to which embodiments of the invention may be applied.

FIG. 1 schematically illustrates a communication network 1 in which users of user equipment (in this example mobile communication devices) 3-1 to 3-3 can communicate with each other and other users via an E-UTRAN base station 5 and a core network 7. As those skilled in the art will appreciate, three mobile communication devices 3 and one base station 5 are shown in FIG. 1 for illustration purposes, additional user equipment and/or base stations may be present in a deployed system.

The base station 5 is coupled to a core network 7 and the core network 7 is also coupled to other networks 10 (e.g. the Internet) via one or more gateways. The interface between the base station 5 and elements of the core network 7 might utilise, for example, a high speed, high bandwidth communication link, such as an optical fiber link and the like. The core network 7 includes, amongst other things, a mobility management entity (MME) 11, a Multimedia Broadcast/Multicast Server Gateway (MBMS GW) 12, a serving gateway (S-GW) 13, and a Packet Data Network (PDN) Gateway (P-GW) 14.

The MME 11 manages general mobility aspects of the mobile communication devices 3 and ensures that connectivity is maintained with the mobile communication devices 3 as they are moving within the geographical area covered by the communication system (and/or as they are handed over between base stations of the communication system). The MME 11 also manages the various bearers associated with the mobile communication devices 3 (e.g. such as an EPS bearer and/or an MBMS bearer) by controlling the other network nodes via which such bearers are provided.

The MBMS GW 12 connects the base station 5 (and hence the mobile communication devices 3 within the base station's cell) to the core network 7 and to a corresponding communication endpoint via the core network 7 (e.g. an application server) when a broadcast/multicast bearer (e.g. an MBMS bearer) is used.

The S-GW 13 connects the base station 5 (and hence the mobile communication devices 3) to the core network 7 when a unicast bearer (e.g. an EPS bearer) is used for communicating user data (including data relating to group services). In this case, the unicast bearer normally terminates at the P-GW 14, although it is often complemented by an external bearer as well (for example, another EPS bearer and/or the like) between the P-GW 14 and a communication end-point outside the core network 7. It will be appreciated that, whilst shown as separate entities, the functionalities of the S-GW 13 and the P-GW 14 could be implemented in a single gateway element.

The core network 7 is also coupled to a Broadcast/Multicast Service Center (BM-SC) 15 (e.g. via the MBMS GW 12) and a Group Communication System Enabler (GCSE) having an associated Application Server (GCSE AS) 16 to facilitate the provision of group services, such as group communication sessions and/or transmission of multimedia content. Although in this example the BM-SC 15 and the GCSE AS 16 are shown separately from other networks, it will be appreciated that in other examples, either one of the BM-SC 15 and the GCSE AS 16 might form part of either the core network 7 or the external network 10. Further, the BM-SC 15 may also be connected to the P-GW 14 and/or the GCSE AS 16 may be connected to the P-GW 14 via the BM-SC 15 (rather than indirectly). It will also be appreciated that whilst the GCSE AS 16 and the BM-SC 15 are shown as separate entities in FIG. 1, the GCSE AS 16 and the BM-SC 15 may be implemented as a single network node and/or as part of another network node.

In this example, the first and third mobile communication devices 3-1 and 3-3 are outside the coverage of the base station 5. However, the mobile communication devices 3 shown in FIG. 1 are each equipped with ProSe functionality, thus they can establish direct communication bearers, or D2D bearers for short, with each other (assuming they are within each other's vicinity and they have performed an appropriate discovery/connection procedures). Each D2D bearer has an associated Traffic Flow Template (TFT) information that allows identification of the corresponding direct communication bearer and the characteristics of the communications (e.g. quality of service, modulation, transmit power, etc) required/agreed for that direct communication bearer.

In FIG. 1, the mobile communication device 3-2 is located within the base station's 5 MBMS coverage area as indicated by the arrow between the mobile communication device 3-2 and the base station 5. The mobile communication device 3-2 (denoted 'UE-R') is also provided with a relaying functionality to allow data to be relayed between other user equipment and the network (via the base station 5). If the mobile communication device 3-2 is located within the coverage area of the base station 5 where (e)MBMS is not available (e.g. due to the limited reach of the (e)MBMS signals) but where normal ('non-MBMS') base station 5 services can still be provided, the first mobile communication device 3-1 (denoted 'UE1') and the third mobile communication device 3-3 (denoted 'UE3') can access and be served by the core network 7 via the UE-R 3-2, using their associated unicast bearers (which are relayed through the UE-R 3-2) with the network.

The GCSE allows multiple mobile communication devices of a particular group to receive the same 'group' service(s) and to communicate with each other via the network, using the GCSE AS 16. A study on architecture enhancements to support group communication functionality for LTE (including ProSe based group communications) presented in the 3GPP TR 23.768 document (the contents of which are incorporated herein by reference) introduces the GCSE and the associated Application Server.

When unicast bearers are used, there is a separate, respective dedicated unicast communication path ('bearer') provided (via the core network 7) between the GCSE AS 16 and each mobile communication device 3 communicating with the GCSE AS 16 (typically via the P-GW 14, S-GW 13 and the base station 5). In this case, the GCSE AS 16 sends data to each respective mobile communication device 3 separately, using the associated unicast bearer for that mobile communication device 3.

In order to minimise the load resulting from simultaneous unicast transmissions to multiple mobile communication devices (of essentially the same data), the GCSE AS 16 is configured to use broadcast or multicast bearers, whenever possible. When using a broadcast/multicast bearer, the GCSE AS 16 communicates data (for a particular group service) to the base station 5 via the BM-SC 15 and the MBMS GW 12 in the core network 7. The broadcast/multicast data is sent, to each mobile communication device 3 arranged to receive the same group service (and to each UE-R that serves a mobile communication device 3 arranged to receive the same group service), by its serving base station 5 in a synchronised manner. If the mobile communication devices 3 are served by different base stations, each serving base station is configured, via the BM-SC 15, to transmit the data at the same time and only once to all mobile communication device 3 arranged to receive the same group service. Accordingly, there is no need to provide a separate, dedicated bearer between the GCSE AS 16 and each mobile communication device 3 involved in the same group service.

In order to ensure that each mobile communication device 3 of a particular group receives data/content intended for its group, the GCSE AS 16 maintains information on which mobile communication devices 3 belong to which group(s), and which mobile communication devices 3 can be reached using broadcast/multicast transmissions and/or which mobile communication devices can be reached using unicast only (e.g. mobile communication devices that are currently located outside the (e)MBMS coverage such as devices served by a non-MBMS capable base station or the like). Mobile communication devices that are not reachable using broadcast/multicast transmissions (e.g. whilst they are outside the (e)MBMS coverage) communicate with the GCSE AS 16 (e.g. send/receive data) using their associated unicast bearer. Of course, even if some mobile communication devices need to use unicast bearers to take part in group services, the GCSE AS 16 still sends group data to other mobile communication devices (e.g. mobile communication devices within MBMS coverage) using the common broadcast/multicast bearer, as described above, whenever possible. The GCSE AS 16 also maintains and advertises to other network elements (e.g. to base stations) the respective Temporary Mobile Group Identities (TMGIs) associated with each available group service and/or multimedia content.

It will be appreciated that, because the first and third mobile communication devices 3-1 and 3-3 are out of range of the base station 5 (thus also out of (e)MBMS coverage), the 'out-of-range' mobile communication devices 3-1 and 3-3 cannot listen to the base station's 5 MBMS signals, and so cannot receive broadcast/multicast transmissions from the GCSE AS 16 (via the MBMS GW 12 and the base station 5) and/or other nodes. However, rather than treat the first and third mobile communication devices 3-1 and 3-3 as if they are outside the (e)MBMS coverage (by initiating unicast communication between the GCSE AS 16 and the out-of-range mobile communication devices 3-1 and 3-3) the GCSE is configured to treat the mobile communication devices 3-1 and 3-3 as if they can receive (e)MBMS communications as normal.

Thus, in operation, the data for a particular group service that the out-of-range mobile communication devices 3-1 and 3-3 are arranged to receive is sent via the broadcast/multicast bearer to the UE-R 3-2 as normal without the need to set up multiple unicast bearers and without needing the associated communication resources.

In order to allow the out-of-range mobile communication devices 3-1 and 3-3 to receive the group service data provided using the broadcast/multicast bearer the UE-R 3-2, beneficially, maintains information identifying the mobile communication devices 3-1, 3-3 that the UE-R 3-2 serves via respective D2D bearers and which are members of the group for which the received group service data is destined. Further, the UE-R 3-2 is beneficially arranged to receive group service data destined for any mobile communication device 3-1, 3-3 that it serves via a D2D bearer even if the UE-R 3-2 is not, itself, a member of the group for which the received group service data is destined.

Hence, in this example, the first mobile communication device 3-1, using its relayed network connection, can discover that group services are available via the UE-R 3-2 (e.g. because the UE-R 3-2 is within the coverage of the base station 5 and within (e)MBMS coverage). For example, the UE-R 3-2 (or the GCSE AS 16) may advertise a list of group services that are available in this network and the first mobile communication device 3-1 may be configured to listen for such advertisements.

When the user of the mobile communication device 3-1 is interested in joining one or more groups and/or receiving some of the multimedia content provided by the GCSE AS 16, therefore, the mobile communication device 3-1 sends an indication towards the network (e.g. just to the UE-R 3-2 or to the UE-R 3-2 for forwarding to another entity in the network) indicating the user's interest. For example, the user's interest in a particular group service may be indicated by providing the TMGI associated with that group service.

In this example, the mobile communication device 3-1 indicates an interest in a particular group service (e.g. 'G1') by sending an appropriate message to the UE-R 3-2 and by including in this message information identifying the G1 group service (e.g. the associated TMGI thereof) that the user of the mobile communication device 3-1 is interested in. The message effectively requests the UE-R 3-2 to configure forwarding, to the first mobile communication device 3-1, of any subsequently received (e)MBMS data (that the UE-R 3-2 receives via broadcast/multicast from the base station 5) for the G1 group service. Based on the information included in the received message, the UE-R 3-2 stores data (e.g. mapping data) identifying which mobile communication device 3 (e.g. UE-1) indicated an interest in which service (e.g. G1).

The GCSE is also informed that the user of mobile communication device 3-1 wishes to receive the G1 group service and that this can be achieved using broadcast/multicast bearers (via the UE-R 3-2 and until the UE-R 3-2 remains within (e)MBMS coverage). The GCSE marks the mobile communication device 3-1 as being under (e)MBMS coverage (e.g. by adding it to a list of UEs within (e)MBMS coverage or removing it from a list of UEs requiring unicast bearers) and starts transmitting any subsequent group services data belonging to the G1 group service to the mobile communication device 3-1 over a broadcast/multicast bearer (e.g. via the MBMS GW 12 rather than via the mobile communication device's 3-1 unicast bearer via the P-GW 14).

On receipt of the G1 group service data the UE-R 3-2 forwards it to the mobile communication device 3-1 that indicated its interest in that service using the associated D2D bearer. Specifically, the UE-R 3-2 monitors broadcast/multicast data flows transmitted by the base station 5 and recovers IP packets from the monitored data flows (in this case the data flow for service G1). The UE-R 3-2 then filters the IP packets using the D2D TFT template associated with the mobile communication device 3 (e.g. UE-1) that indicated an interest in the service (e.g. G1), thereby identifying the appropriate D2D bearer (of the intended destination) via which the UE-R 3-2 need to transmit the IP packets.

If any further mobile communication device (e.g. the third mobile communication device 3-3) is also interested in the same (G1) group service (and have indicated so by sending an appropriate signalling message), the UE-R 3-2 creates a mapping between each service (i.e. the TMGI thereof) and the respective mobile communication device(s) 3 (i.e. their associated D2D bearers) that indicated an interest in that service. Thus, when receiving broadcast/multicast data from the GCSE 16 (via the base station 5), the UE-R 3-2 can forward the IP packets for each group service to the appropriate mobile communication device(s) 3 by performing an appropriate filtering using the associated D2D TFT template (s). When a user operating the UE-R 3-2 is also interested in the same content (same TMGI), the UE-R 3-2 forwards the IP packets to higher layers of the UE-R 3-2 as well (e.g. to a GCSE application, or the like).

In any case, if at least one mobile communication device 3 has indicated interest in the same group service, the UE-R 3-2 can duplicate the associated broadcast/multicast data before forwarding it over the respective D2D bearers (and/or to higher layers) to the mobile communication devices 3 that have indicated an interest in that group service. Such duplication is beneficially performed by the lower layers, e.g. without requiring the UE-R 3-2 to pass the broadcast/multicast data up to the application layer.

Advantageously, deciphering of the received data (IP packets) is carried out only by the mobile communication device 3 to which that data was intended (e.g. in accordance with the device's indicated interest/group membership). Thus, even though the UE-R 3-2 recovers the IP packets from the received data flows before forwarding them to the relayed mobile communication device 3-1, the UE-R 3-2 only needs to decipher data for a particular group service (G1, etc.) when a user of the UE-R 3-2 is also a subscriber to that group service.

In summary, the system makes it possible to provide a group service to a mobile communication device 3-1 (and/or the mobile communication device 3-3) that is located outside the (e)MBMS coverage of a base station 5 and that is therefore not able to receive group services using a broadcast/multicast bearer, without requiring the use of a dedicated unicast bearer from the network to the mobile communication device 3-1 (via the UE-R 3-2 or otherwise). This is achieved by providing a relayed network connection for the mobile communication device 3-1 that is located outside the coverage of a base station via another mobile communication device 3-2 (that is itself connected to the base station 5) acting as a UE-R and having a direct bearer to the first mobile communication device 3-1. The node sending group service related data (in this example, the GCSE AS) is informed by the mobile communication device 3-1 (via the UE-R 3-2) that the mobile communication device 3-1 is interested in receiving group services. The UE-R 3-2 is configured for forwarding IP packets recovered from the (e)MBMS data flows associated with the group service over the direct bearer to the first mobile communication device 3-1.

In effect, therefore, a shortened 'unicast' bearer is provided, from the UE-R 3-2 to each out-of-range mobile communication device 3-1, 3-3 that group service data is destined for, for forwarding that group service data when it is received, via multicast/broadcast, by the UE-R 3-2.

Thus, the UE-R 3-2 is advantageously able to relay data received through (e)MBMS to another mobile communication device 3 that is not under network (base station) coverage and thereby help reducing the amount of resources needed between the GCSE AS 16 and the base stations. This benefit flows from the fact that the data is sent using an already existing (and preferred) broadcast/multicast bearer without the need for using a separate unicast bearer for the mobile communication device that is not directly served by a base station.

The above system may be particularly advantageous when multiple mobile communication devices (e.g. both mobile communication device 3-1 and 3-3 that are outside of network coverage and connect to the core network 7 via the same UE-R 3-2) are interested in receiving the same multicast flow(s), e.g. group communication flow(s). In this case, since (e)MBMS data is transmitted up to the UE-R 3-2, the resources required over the air interface, between the base station 5 and the UE-R 3-2, may also be optimised (in addition to the resources required between the GCSE AS 16 and the base station 5) because they do not need to support multiple 'unicast' bearers (one for each out-of-range mobile communication device receiving the group service data).

GCSE Architecture

Figure 2:
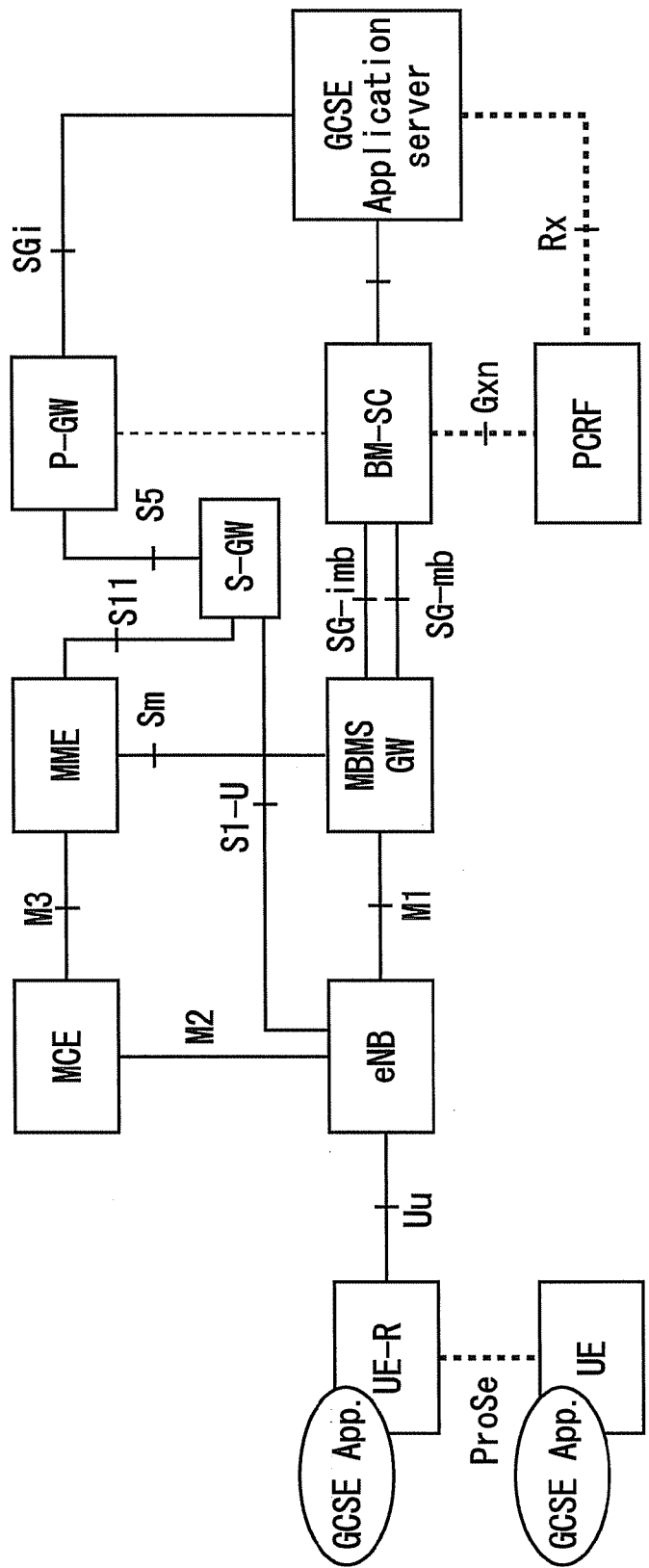
FIG. 2 illustrates schematically a network architecture for 3GPP GCSE services.
Figure 6:
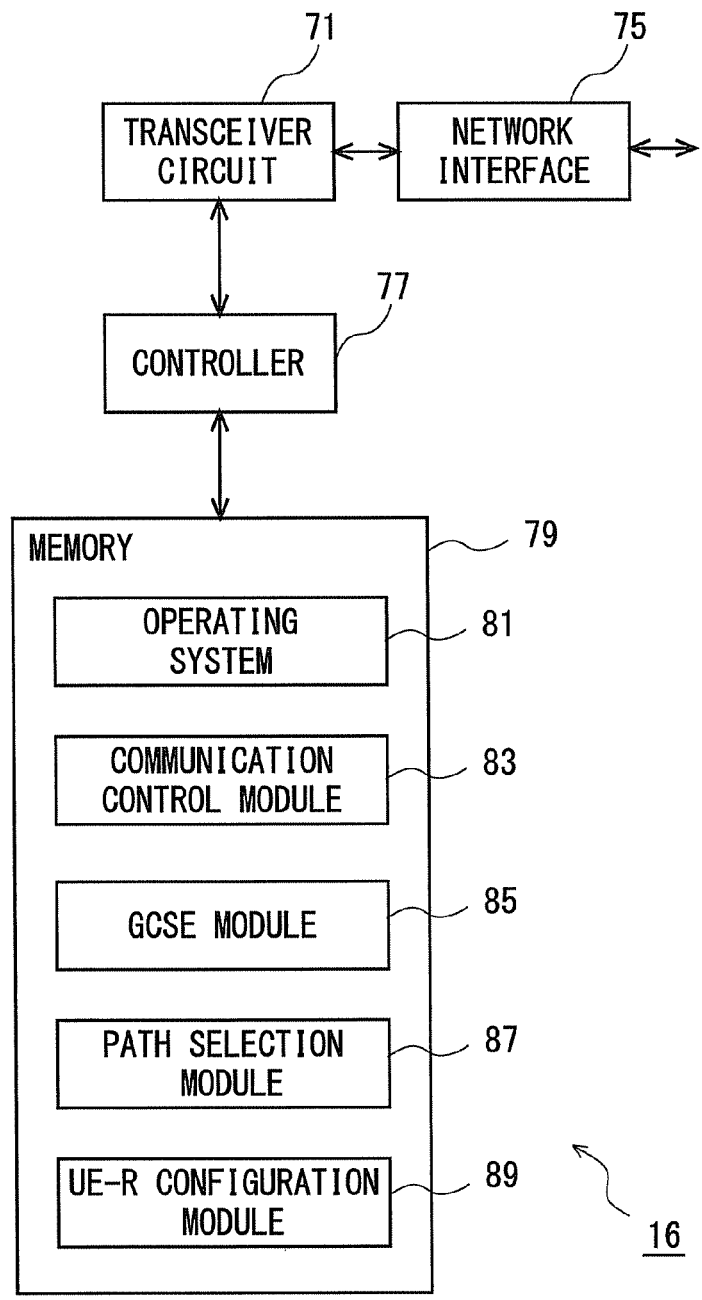
FIG. 6 is a functional block diagram illustrating some of the functionality of a GCSE Application Server forming part of the system shown in FIG. 1.

FIG. 2 illustrates schematically an exemplary network architecture for the provision of 3GPP GCSE services, as specified in FIG. 6.1.1.2-1 of the 3GPP TR 23.768 document. Each rectangular box represents a network node, and each line between network nodes represents an interface provided for communication between the corresponding two network nodes (the name of the interface being indicated next to each connecting line). The elliptical shapes illustrate the GCSE application running on a relayed mobile communication device (denoted UE) and a relaying mobile communication device (denoted UE-R), and which applications are configured to communicate, using application level messages, with a GCSE application server via the various network nodes, as appropriate.

Mobile Communication Device

Figure 3:
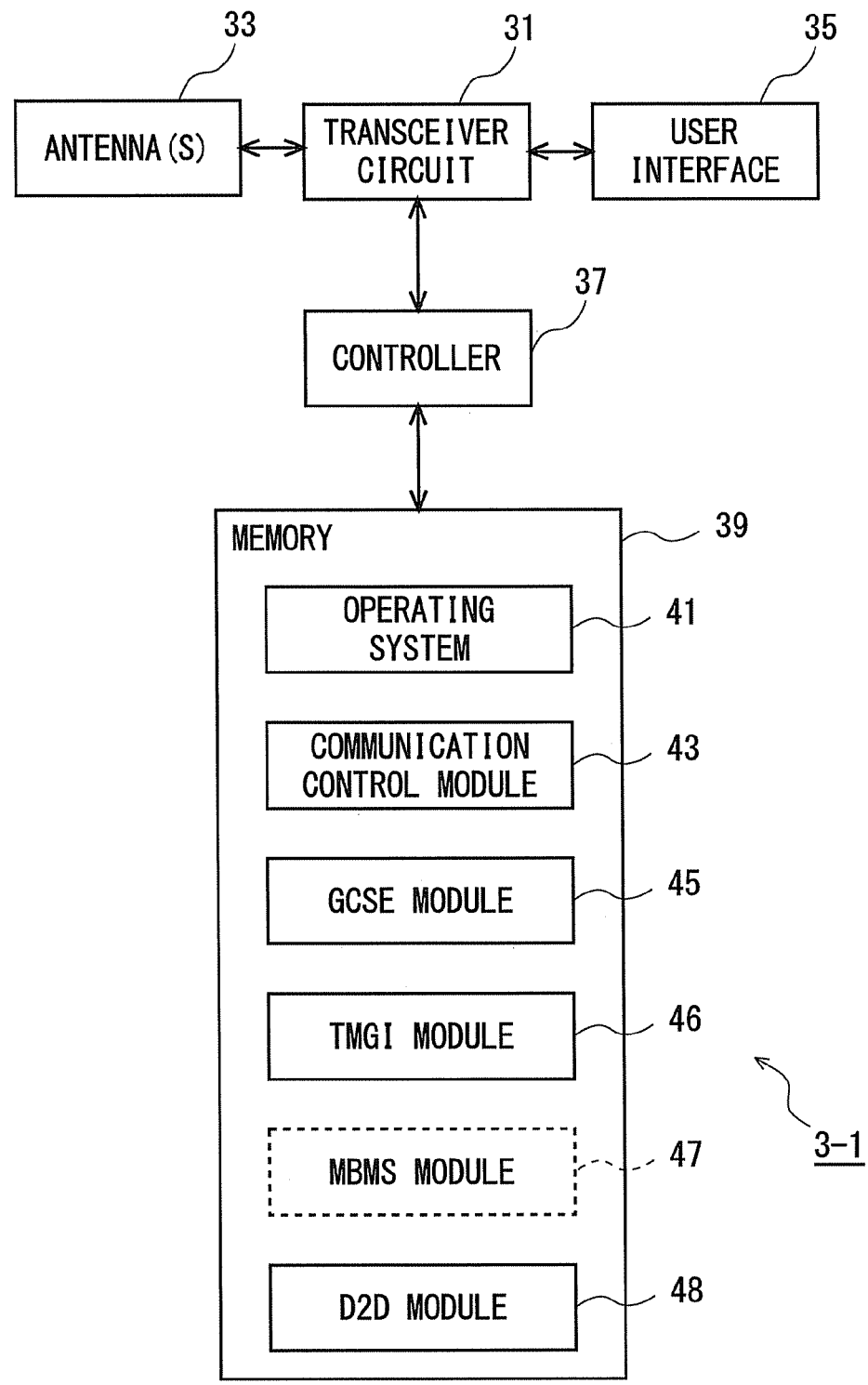
FIG. 3 is a functional block diagram illustrating some of the functionality of a mobile communication device forming part of the system shown in FIG. 1.

FIG. 3 is a functional block diagram illustrating some of the functionality of a mobile communication device 3 (e.g. the mobile communication device 3-1 shown in FIG. 1). As shown, the mobile communication device 3 has a transceiver circuit 31 that is operable to transmit signals to and to receive signals from a base station 5 and/or other mobile communication devices 3 via one or more antenna 33. The mobile communication device 3 has a controller 37 to control the operation of the mobile communication device 3. The controller 37 is associated with a memory 39 and is coupled to the transceiver circuit 31. Although not necessarily shown in FIG. 3, the mobile communication device 3 will of course have all the usual functionality of a conventional mobile communication device (such as a user interface 35) and this may be provided by any one or any combination of hardware, software and firmware, as appropriate. Software may be pre-installed in the memory 39 and/or may be downloaded via the communication network or from a removable data storage device (RMD), for example.

The controller 37 is configured to control overall operation of the mobile communication device 3 by, in this example, program instructions or software instructions stored within the memory 39. As shown, these software instructions include, among other things, an operating system 41, a communication control module 43, a GCSE module 45, a TMGI module 46, a multimedia broadcast/ multicast services (MBMS) module 47 (optional), and a device-to-device (D2D) module 48.

The communication control module 43 handles (e.g. generates, sends and receives) control signals for controlling the connections between the mobile communication device 3 and other mobile communication devices, the base station 5, or the core network entities. The communication control module 43 also controls the separate flows of uplink/downlink data and signalling that are to be transmitted to/from the other mobile communication devices 3, to/from the base station 5, and the core network entities using associated TFTs.

The GCSE module 45 communicates with the GCSE application server 16 (via the transceiver circuit 31). The GCSE module 45 obtains (e.g. from the GCSE application server 16, using application level signalling) and maintains an association between groups/services and their respective identifiers (e.g. TMGIs). In case a user of the mobile communication device 3 is interested in one or more group services, the GCSE module 45 generates and sends an appropriately formatted signalling message to the GCSE AS 16 indicating an interest in the one or more group services.

The TMGI module 46 discovers identifiers associated with services available in the network, such as (group) services provided via the GCSE AS 16. For example, the TMGI module 46 may obtain (e.g. by listening to broadcast information and/or in response to an appropriate request) a list of TMGIs from the relaying mobile communication device 3-2 and/or the base station 5 (whilst within the coverage area thereof).

The multimedia broadcast/multicast services module 47 receives downlink data from other nodes (via the base station 5) using broadcast/multicast signalling. The multimedia broadcast/multicast services module 47 may receive downlink data using any suitable technology for the simultaneous broadcast and/or multicast of content, for example the Multimedia Broadcast/Multicast Service (MBMS) technology, the enhanced MBMS (eMBMS) technology, and/or the like. However, since in this example the mobile communication device 3-1 receives service data via the UE-R 3-2 (and hence the relevant MBMS data is forwarded by the UE-R 3-2 via an associated D2D bearer), such an MBMS module 47 is optional (at least for the mobile communication device 3-1).

The device-to-device module 48 is operable to instruct the communication control module 43 to set up a device-to-device communication path (e.g. a ProSe based relaying functionality) to other compatible user equipment in the vicinity of the mobile communication device 3. Each device-to-device communication path is associated with at least one D2D TFT, e.g. a downlink D2D TFT and an uplink D2D TFT.

Mobile Communication Device (Configured as a UE-R)

Figure 4:
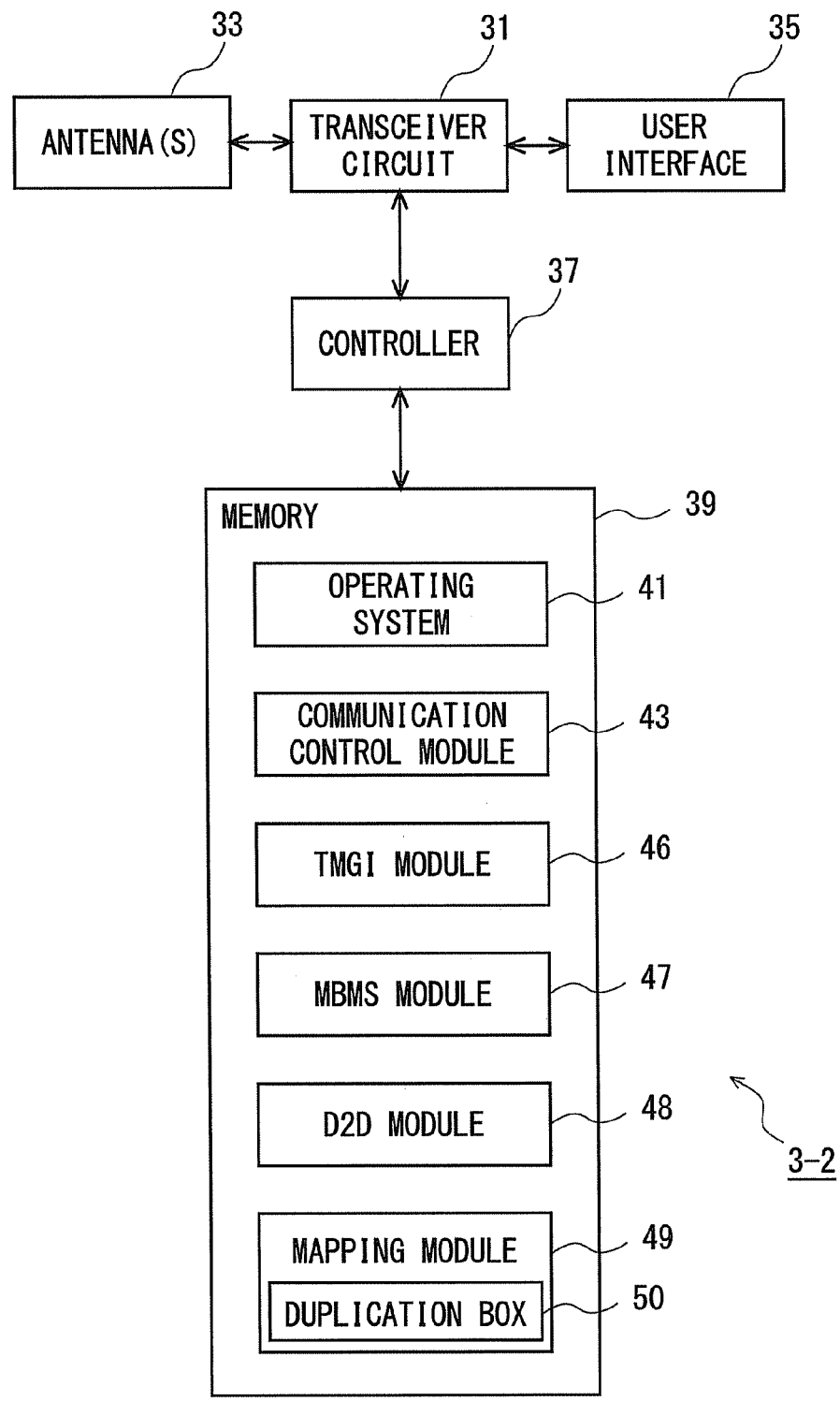
FIG. 4 is a functional block diagram illustrating some of the functionality of a relaying mobile communication device (UE-R) forming part of the system shown in FIG. 1.

FIG. 4 is a functional block diagram illustrating some of the functionality of a mobile communication device (e.g. the UE-R 3-2 shown in FIG. 1) configured for relaying data for other communication devices 3. In FIGS. 3 and 4, like-numbered modules carry out the same functionality, where appropriate.

As shown, the relaying mobile communication device 3-2 has a transceiver circuit 31 that is operable to transmit signals to and to receive signals from a base station 5 and/or other mobile communication devices 3 via one or more antenna 33. The relaying mobile communication device 3-2 has a controller 37 to control the operation of the relaying mobile communication device 3-2. The controller 37 is associated with a memory 39 and is coupled to the transceiver circuit 31. Although not necessarily shown in FIG. 4, the relaying mobile communication device 3-2 will of course have all the usual functionality of a conventional mobile communication device 3 (such as a user interface 35) and this may be provided by any one or any combination of hardware, software and firmware, as appropriate. Software may be pre-installed in the memory 39 and/or may be downloaded via the communication network or from a removable data storage device (RMD), for example.

The controller 37 is configured to control overall operation of the relaying mobile communication device 3-2 by, in this example, program instructions or software instructions stored within the memory 39. As shown, these software instructions include, among other things, an operating system 41, a communication control module 43, a TMGI module 46, a multimedia broadcast/multicast services (MBMS) module 47, a device-to-device (D2D) module 48, and a mapping module 49 (which includes a duplication box 50). Optionally, the relaying mobile communication device 3-2 may include additional modules, e.g. the GCSE module 45, if appropriate.

The communication control module 43 handles (e.g. generates, sends and receives) control signals for controlling the connections between the relaying mobile communication device 3-2 and other mobile communication devices 3, the base station 5, or the core network entities. The communication control module 43 also controls the separate flows of uplink/downlink data and signalling that are to be transmitted from/to the other mobile communication devices 3, to/from the base station 5, and the core network entities using associated TFTs.

If present, the GCSE module 45 communicates with the GCSE application server 16 (via the transceiver circuit 31). In case a user of the relaying mobile communication device 3-2 is interested in one or more group services, the GCSE module 45 generates and sends an appropriately formatted signalling message to the GCSE AS 16 indicating an interest in the one or more group services.

The TMGI module 46 discovers identifiers associated with services available in the network, such as identifiers associated with (group) services provided via the GCSE AS 16. For example, the TMGI module 46 may obtain a list of TMGIs by listening to broadcast information from a base station 5. The TMGI module 46 also advertises (to other mobile communication devices) identifiers of services available in the network and/or that have been discovered. For example, the TMGI module 46 may provide the list of services (e.g. a list of TMGIs) provided by the GCSE AS 16 to the relayed mobile communication devices 3-1 and 3-3 (e.g. via broadcast, during discovery, and/or upon request).

The multimedia broadcast/multicast services module 47 receives downlink data from other nodes (via the base station 5) using broadcast/multicast signalling. The multimedia broadcast/multicast services module 47 may receive downlink data using any suitable technology for the simultaneous broadcast and/or multicast of content, for example the Multimedia Broadcast/Multicast Service (MBMS) technology, the enhanced MBMS (eMBMS) technology, and/or the like. The multimedia broadcast/multicast services module 47 makes the received data available to other modules, e.g. the GCSE module 45, as appropriate.

The device-to-device module 48 is operable to instruct the communication control module 43 to set up a device-to-device communication path (e.g. a ProSe based relaying functionality) to other compatible user equipment in the vicinity of the relaying mobile communication device 3-2. Each device-to-device communication path is associated with at least one D2D TFT, e.g. a downlink D2D TFT and an uplink D2D TFT.

The mapping module 49 is responsible for mapping TMGIs (provided by the GCSE module 45) to the appropriate D2D bearer(s) (provided by the device-to-device module 48) using the D2D TFTs, in dependence on which relayed user equipment, if any, has indicated an interest in a particular service identified by e.g. its associated TMGI. The mapping module 49 receives data flows (e.g. IP packets) associated with the multimedia broadcast/multicast services from the MBMS module 47 and forwards (relays) the received data over the D2D bearer(s) based on the mapping provided by the D2D TFT(s). The mapping module 49 has a so-called 'duplication box' 50, which is responsible for duplicating the received data, e.g. if the received data needs to be relayed to at least one or more items of user equipment.

Mobility Management Entity

Figure 5:
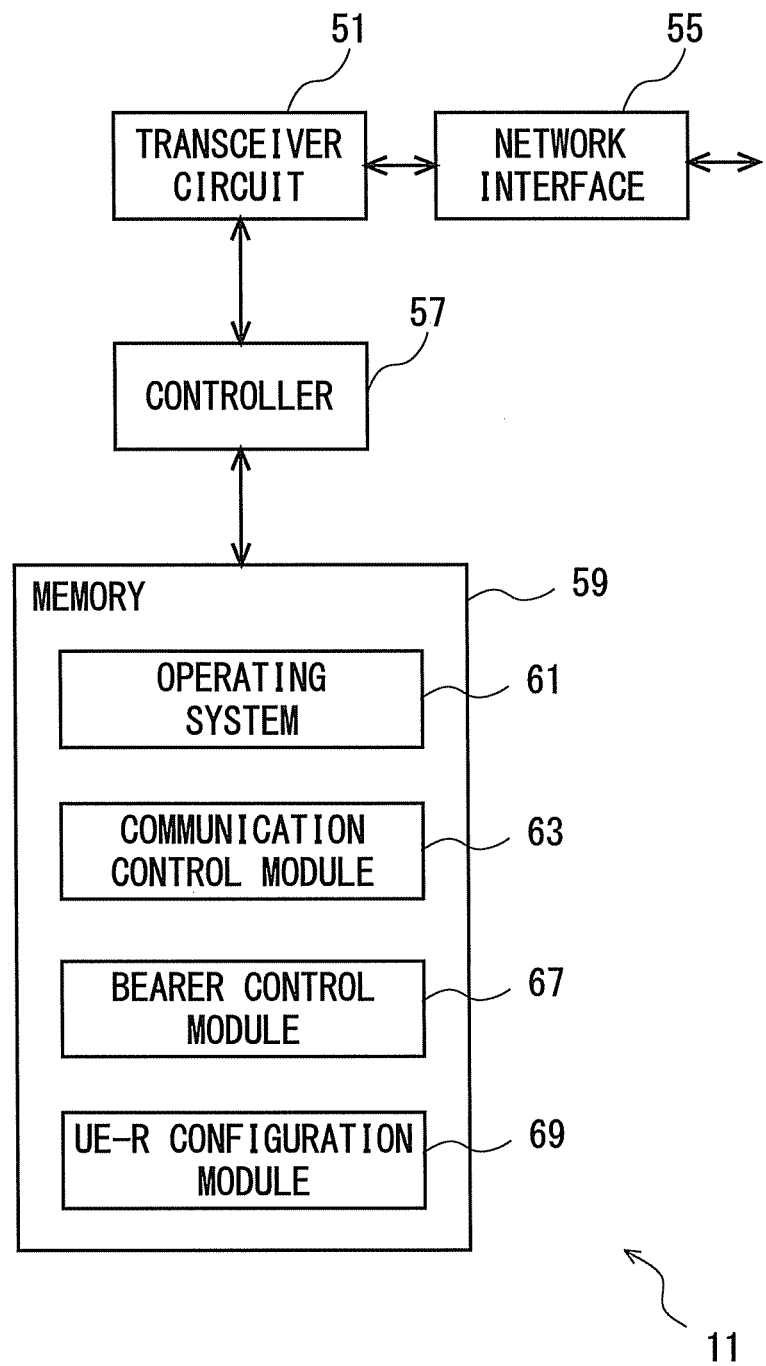
FIG. 5 is a functional block diagram illustrating some of the functionality of a Mobility Management Entity (MME) forming part of the system shown in FIG. 1

FIG. 5 is a functional block diagram illustrating some of the functionality of a Mobility Management Entity 11 forming part of the system 1 shown in FIG. 1. As shown, the MME 11 has a transceiver circuit 51 that is operable to transmit signals to and to receive signals from a base station 5 and/or the mobile communication devices 3 via a network interface 55. The MME 11 has a controller 57 to control the operation of the MME 11. The controller 57 is associated with a memory 59 and is coupled to the transceiver circuit 51. Software may be pre-installed in the memory 59 and/or may be downloaded via the communication network or from a removable data storage device (RMD), for example.

The controller 57 is configured to control overall operation of the MME 11 by, in this example, program instructions or software instructions stored within the memory 59. As shown, these software instructions include, among other things, an operating system 61, a communication control module 63, a bearer control module 67, and a UE-R configuration module 69.

The communication control module 63 handles (e.g. generates, sends and receives) control signals for controlling the connections between the MME 11 and other communication nodes (e.g. the mobile communication devices 3, the base station 5, the other core network entities, or the GCSE AS 16).

The bearer control module 67 controls other network entities such as the MBMS GW 12 and a Multi-cell/multicast Coordination Entity (MCE—shown in FIG. 2) for coordination of base stations when transmitting MBMS data (over an associated broadcast/multicast bearer). The bearer control module 67 also controls the S-GW 13 and the P-GW 14, when appropriate (e.g. in case of unicast/EPS bearers).

The UE-R configuration module 69 assists the configuration of the mobile communication device 3-2 acting as a UE-R for forwarding group services data (e.g. broadcast/multicast data) to relayed user equipment. In order to do so, the UE-R configuration module 69 sends appropriate configuration data to the UE-R 3-2 in a signalling message (e.g. upon request by the UE-R, when the mobile communication device 3-2 is being set up as a UE-R, and/or in response to other user equipment connecting to the UE-R for receiving relayed group services). The UE-R configuration module 69 may also assist, to the extent necessary, the configuration of other (e.g. non-relaying) mobile communication devices that are interested in receiving group services data (via the UE-R 3-2).

Group Communication System Enabler Application Server

FIG. 6 is a functional block diagram illustrating some of the functionality of a GCSE application server 16 forming part of the system 1 shown in FIG. 1.

As shown, the GCSE AS 16 has a transceiver circuit 71 that is operable to transmit signals to and to receive signals from base stations 5 and/or mobile communication devices 3 via a network interface 75. The GCSE AS 16 has a controller 77 to control the operation of the GCSE AS 16. The controller 77 is associated with a memory 79 and is coupled to the transceiver circuit 71. Software may be pre-installed in the memory 79 and/or may be downloaded via the communication network or from a removable data storage device (RMD), for example.

The controller 77 is configured to control overall operation of the GCSE AS 16 by, in this example, program instructions or software instructions stored within the memory 79. As shown, these software instructions include, among other things, an operating system 81, a communication control module 83, GCSE module 85, a path selection module 87, and a UE-R configuration module 89.

The communication control module 83 handles (e.g. generates, sends and receives) control signals for controlling the connections between the GCSE AS 16 and other communication nodes (e.g. the mobile communication devices 3, the base station 5, the other core network entities, or the MME 11).

The GCSE module 85 supports the provision of group (communication) services for compatible user equipment connected to the communication network 1. The GCSE module 85 associates an appropriate identifier, e.g. a TMGI, to each available group service and provides a list of available group services and/or their associated identifiers, to other nodes of the communication network. The GCSE module 85 registers which user (i.e. which user equipment) subscribed for (shown interest in) which group service made available in the network, and communicates data to/from each subscribed item of user equipment accordingly (e.g. via an appropriate GCSE module 45 thereof).

The path selection module 87 maintains a database (e.g. a list, a table, and/or the like) comprising information whether communications with a particular network node (e.g. a base station, user equipment, etc) can be effected via broadcast/multicast bearer(s) and/or unicast bearer(s). When the GCSE module 85 has data to send to the members of a particular group service, the path selection module 87 checks which member can receive the data via broadcast/multicast and which member can receive the data via unicast, and instructs the GCSE module 85 to send the data to each member accordingly.

The UE-R configuration module 89 assists the MME 11, if appropriate, in configuring the mobile communication device 3-2 (acting as a UE-R) for forwarding group services data (e.g. IP packets) to relayed user equipment. Specifically, the UE-R configuration module 89 provides, via the MME 11, configuration data to the UE-R 3-2 for realising data forwarding to relayed user equipment for a given group service. Such configuration data may be provided e.g. upon request by the UE-R 3-2, and/or when the relayed user equipment connect to the UE-R 3-2 (and inform the GCSE AS 16 accordingly) for receiving relayed group services. Whenever the UE-R 3-2 has been configured to relay broadcast/multicast data to a particular member of a group service (or the UE-R 3-2 has been configured not to relay broadcast/multicast data), the UE-R configuration module 89 informs the path selection module 87 that this particular member is now reachable (or not reachable) using broadcast/multicast so that the path selection module 87 can update its database accordingly. The UE-R configuration module 89 may also assist, to the extent necessary, the configuration of other (e.g. non-relaying) mobile communication devices that are interested in receiving group services data (via the UE-R 3-2).

In the above description, the mobile communication devices 3, the mobility management entity 11, and the GCSE AS 16 are described for ease of understanding as having a number of discrete modules (such as the communications control modules, the GCSE modules, and the UE-R configuration modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

Operation—Configuration by the UE-R

A more detailed description will now be given (with reference to FIGS. 7 to 9) of providing broadcast/multicast services via a mobile communication device configured as a UE-R.

Figure 7:
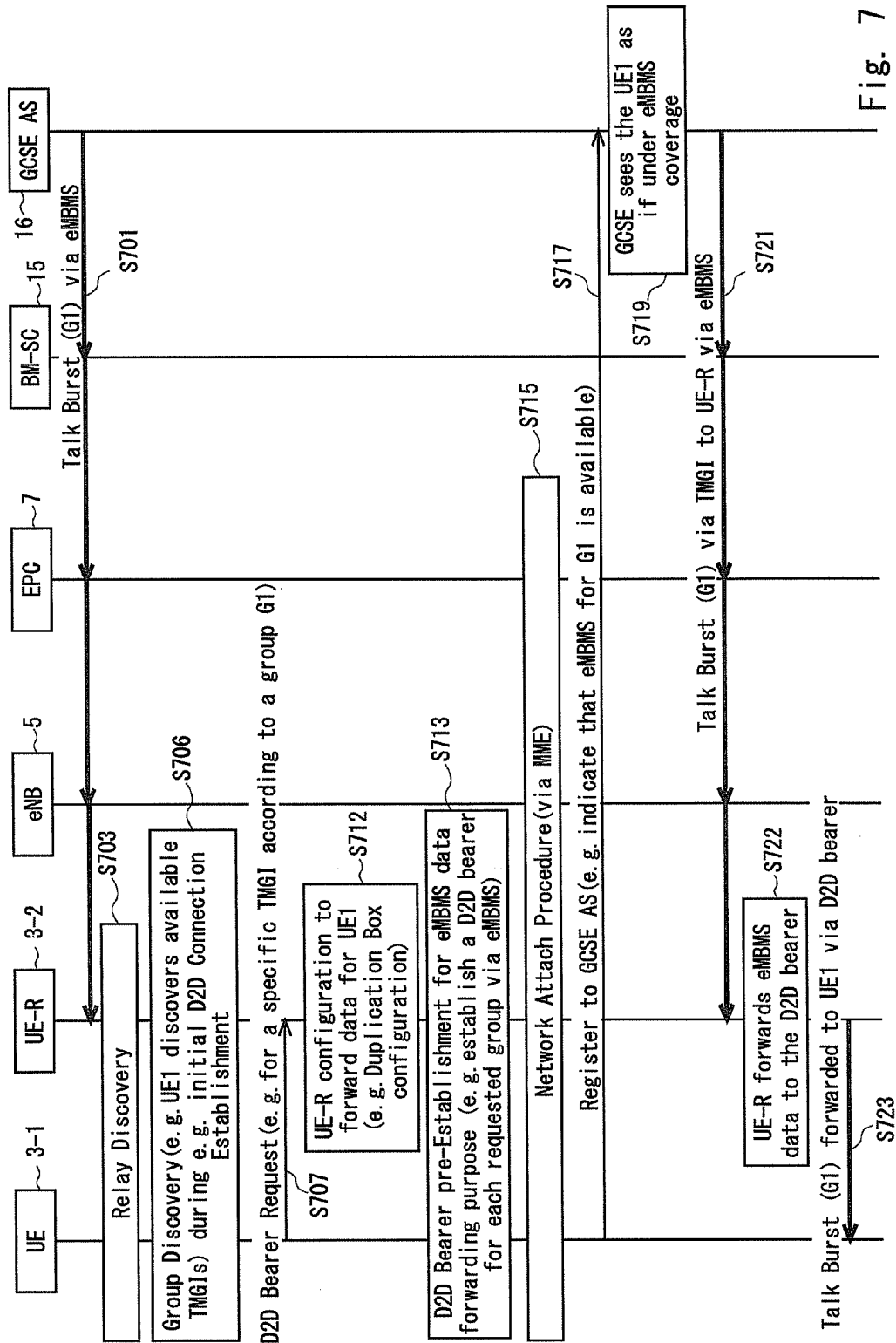
FIG. 7 is a timing diagram illustrating an exemplary way in which multimedia broadcast/multicast services are realised using a relaying mobile communication device forming part of the system shown in FIG. 1.

FIG. 7 is a timing diagram illustrating an exemplary way in which multimedia broadcast/multicast services are realised using a relaying mobile communication device 3-2 forming part of the system 1 shown in FIG. 1.

Initially, the second mobile communication device 3-2 is set up as a UE-R (although there may not be any user equipment connected to it yet) and the mobile communication device 3-2 is within (e)MBMS coverage of the group services (e.g. 'G1') made available in the network. The UE-R 3-2 (using its TMGI module 46) discovers identifiers of services provided in the network, e.g. obtains any corresponding TMGI(s) associated with services provided by the GCSE AS 16 (and/or other nodes). Therefore, as generally illustrated at step S701, whenever there is data transmitted from the GCSE AS 16 to members of a particular group (in this example, talk bust data for group G1), the UE-R 3-2 can receive the associated group data via the base station 5 (typically via a broadcast/multicast bearer, e.g. eMBMS, using its MBMS module 47) when this data is associated with an appropriate TMGI.

In step S703, the mobile communication device 3-1 (which is currently located outside the MBMS coverage of the base station 5) and the UE-R 3-2 perform a relay discovery procedure (using their respective D2D modules 48). The procedure at step S703 can be initiated by either mobile communication device by sending an appropriate D2D beacon, and the relay discovery procedure may comprise exchanging one or more signalling messages between the mobile communication device 3-1 and 3-2 (and possibly involving the base station and/or a core network 7 entity, e.g. the MME 11).

As generally indicated at step S706, following (or as part of) the relay discovery procedure, the mobile communication device 3-1 performs, using its TMGI module 46, a group discovery procedure via the UE-R 3-2 and obtains information identifying services (which include group service G1) available in the network to which the mobile communication device 3-1 can be connected via the UE-R 3-2. The information identifying the available services, in this example, is announced in the form of a list of TMGIs (originally provided by the GCSE AS 16). Using its GCSE module 45, the mobile communication device 3-1 can verify that the identifiers obtained by the TMGI module 46 include the TMGI for group service G1.

Since the user of the mobile communication device 3-1 is interested in the group service G1, the mobile communication device 3-1 generates (using its D2D module 48) and sends, at step S707, an appropriately formatted signalling message to the UE-R 3-2, requesting the UE-R 3-2 to set up a D2D bearer for group service related communications associated with group G1. In this example, the signalling message at S707 (e.g. a 'D2D bearer request' signalling message) includes information identifying group service G1 by its specific TMGI.

In response to receiving the 'D2D bearer request' signalling message, the UE-R 3-2 configures its mapping module 49 (and/or its duplication box 50) for mapping the information identifying the group service G1 (e.g. its associated TMGIs provided by the TMGI module 46) to the correct D2D bearer(s) (provided by the device-to-device module 48) using the D2D TFT(s) for the mobile communication device 3-1. This is generally illustrated in step S712.

Next, in step S713 the UE-R 3-2 and the mobile communication device 3-1 complete a D2D bearer (pre-)establishment procedure corresponding to the D2D bearer request sent at S707. The purpose of this D2D bearer is to relay broadcast/multicast (e.g. eMBMS) data from the base station 5 via the UE-R 3-2 to the mobile communication device 3-1 with respect to each group service (in this case, G1) that the mobile communication device 3-1 is interested in—although at this phase the mobile communication device 3-1 might not have informed the GCSE AS 16 about any such interest yet.

Since at this phase the mobile communication device 3-1 is not yet connected to the core network 7 (only to the UE-R 3-2), the mobile communication device 3-1 and the MME 11 perform a network attach procedure, as generally indicated at step S715. The network attach procedure also establishes a PDN connection with the core network 7 (e.g. creates an associated EPS bearer between the mobile communication device 3-1 and the P-GW 14).

The mobile communication device 3-1 generates (using its communication control module 43) and sends, at step S717, via the established PDN connection an appropriately formatted signalling message to the GCSE AS 16, requesting the GCSE AS 16 to register the mobile communication device 3-1 for communications using the group service G1. The mobile communication device 3-1 includes in this signalling message an indication that broadcast/multicast services (e.g. eMBMS) for the requested group service (G1) are available for this mobile communication device 3-1. If the mobile communication device 3-1 has previously registered for this group service with the GCSE AS 16 (e.g. whilst being connected to a base station or to another UE-R), this message informs the GCSE AS 16 that the mobile communication device 3-1 is reachable again and serves to update any previous information held by the GCSE AS 16 about the mobile communication device 3-1.

Next, at step S719, the GCSE AS 16 updates its modules in accordance with the information included in the message received at S717. Specifically, the GCSE AS 16 updates its GCSE module 85 (in this example, with information that 'UE1' is registered for service 'G1') and path selection module 87 (in this example, with information that 'UE1' can receive data via broadcast/multicast).

As generally illustrated at step S721, if there is data to be sent to the members/subscribers of group G1, the GCSE AS 16 can send the data to the base station 5 (via the BM-SC 15 and the core network 7) without the GCSE AS 16 having to set up (or use) a dedicated unicast bearer with respect to the mobile communication device 3-1, because the GCSE AS 16 has been notified that the mobile communication device 3-1 is able to receive group services using broadcast/multicast signalling (relayed via the UE-R 3-2). The base station 5 transmits the data associated with group services (in this case, talk burst data for group G1) within its coverage as specified by the BM-SC 15 (e.g. according to a desired synchronisation with other base stations), which is then received by the UE-R 3-2 served by the base station 5.

Since the UE-R 3-2 was set up (at S712) for forwarding any data associated with group service G1 to the mobile communication device 3-1, the UE-R 3-2 proceeds to identify (using its mapping module 49) any D2D bearer associated with the mobile communication device 3-1 using the D2D TFT(s) (which map the information (e.g. TMGI) identifying group service G1 to the corresponding D2D bearer(s)). The UE-R 3-2 then relays (e.g. using its D2D module 48 and/or its duplication box 50) the received talk burst data of group G1 to the mobile communication device 3-1 over the identified D2D bearer associated with that mobile communication device 3-1. If any further mobile communication device (e.g. mobile communication device 3-3 or the UE-R 3-2) is also interested in the group service G1, the UE-R 3-2 also transmits the talk burst data of group G1 to those mobile communication devices as well (e.g. its duplication box 50 duplicating the talk burst data if necessary) over their associated D2D bearers.

Whenever there is any further data to send to the members of group service G1, steps S721 to S723 may be repeated, at least until such group communications to the mobile communication device 3-1 are prevented (e.g. due to the mobile communication device 3-1 no longer being a member of (interested in) group service G1, the mobile communication device 3-1 no longer being connected to the UE-R 3-2, and/or the UE-R 3-2 no longer being within the coverage of the base station 5). It will be appreciated that when multiple relayed mobile communication devices connected to the UE-R 3-2 (e.g. both UE-1 and UE-3) are interested in receiving the G1 group service, step S723 may be performed only once (rather than separately for each relayed mobile communication device), using an appropriately configured (e.g. point-to-multipoint and/or multicast) D2D bearer provided between the UE-R 3-2 and each relayed mobile communication device.

Advantageously, in this example, there is no need for the MME 11 and/or the GCSE AS 16 to implement the functionality for configuring the UE-R 3-2 for forwarding group service data to the mobile communication device 3-1. Accordingly, the corresponding UE-R configuration modules 69 and 89 (of the MME 11 and the GCSE AS 16, respectively) are not required.

Operation—Configuration by the MME

Figure 8:
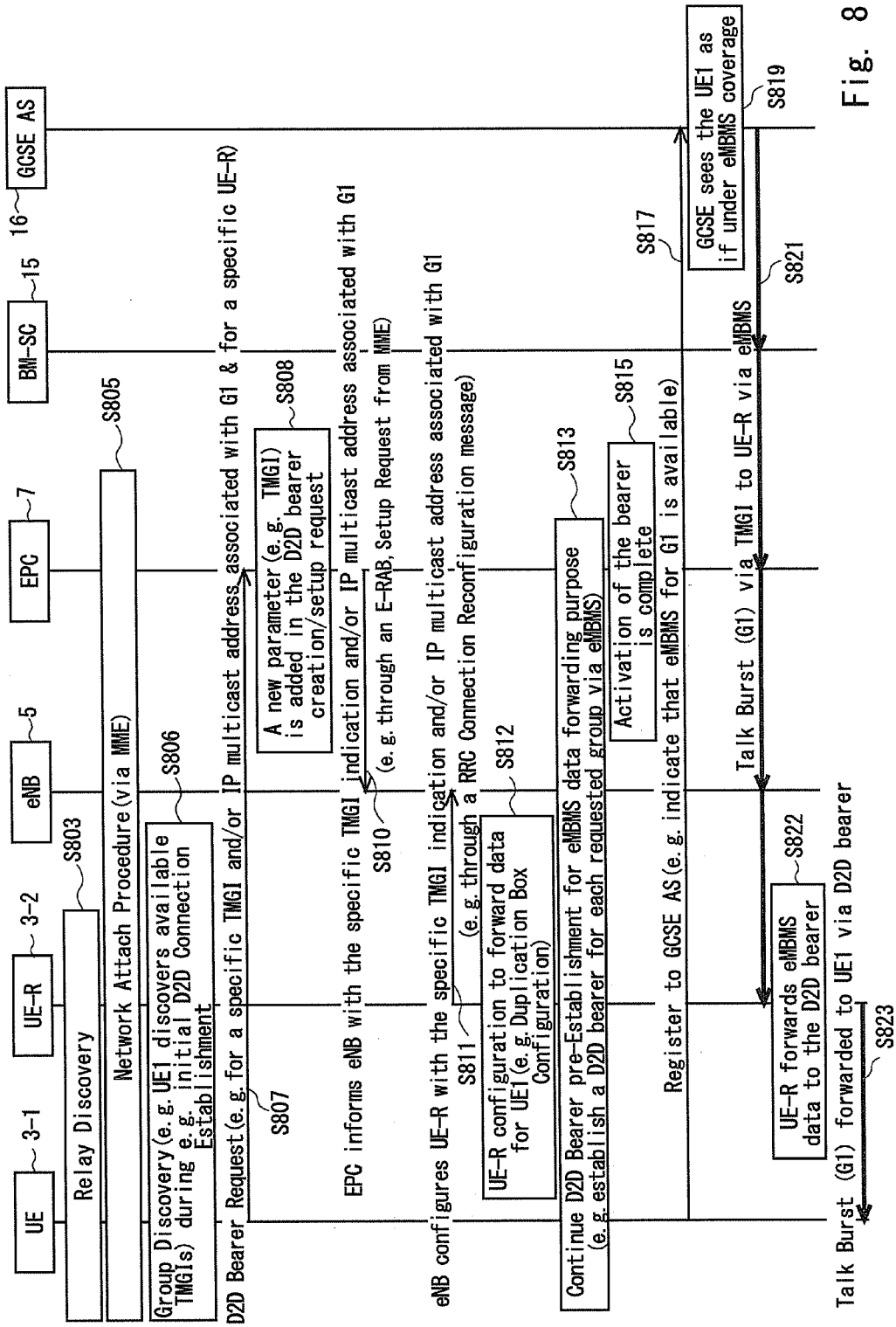
FIG. 8 is a timing diagram illustrating another exemplary way in which multimedia broadcast/multicast services are realised using a relaying mobile communication device forming part of the system shown in FIG. 1.

FIG. 8 is a timing diagram illustrating another exemplary way in which multimedia broadcast/multicast services are realised using a relaying mobile communication device 3-2 forming part of the system 1 shown in FIG. 1. In this example, the UE-R 3-2 is configured (via the base station 5), for forwarding group service communications, by the MME 11 forming part of the core network 7.

Initially, the second mobile communication device 3-2 is set up as a UE-R (although there may not be any user equipment connected to it yet) and the mobile communication device 3-2 (e.g. whilst within MBMS coverage), using its TMGI module 46, discovers identifiers of group services (e.g. 'G1') provided in the network (in a similar manner as described above with reference to step S701 of FIG. 7).

In step S803, the mobile communication device 3-1 (which is currently located outside the coverage of the base station 5) and the UE-R 3-2 perform a relay discovery procedure (using their respective D2D modules 48). The procedure at step S803 can be initiated by either mobile communication device by sending an appropriate D2D beacon, and the relay discovery procedure may comprise exchanging one or more signalling messages between the mobile communication device 3-1 and 3-2 (and possibly involving the base station and/or a core network 7 entity, e.g. the MME 11).

As generally indicated at step S805, the mobile communication device 3-1 (which is now connected to the UE-R 3-2), performs a network attach procedure with the core network 7 (e.g. the MME 11). The network attach procedure also establishes a PDN connection with the core network 7 (e.g. creates an associated an EPS bearer between the mobile communication device 3-1 and the P-GW 14).

At step S806, following (or as part of) the relay discovery procedure (and/or the network attach procedure), the mobile communication device 3-1 performs, using its TMGI module 46, a group discovery procedure via the UE-R 3-2 and obtains information identifying services (which include group service G1) available in the network to which the mobile communication device 3-1 is now connected via the UE-R 3-2. The information identifying the available services, in this example, is announced in the form of a list of TMGIs (originally provided by the GCSE AS 16). Using its GCSE module 45, the mobile communication device 3-1 can verify that the identifiers obtained by the TMGI module 46 include the TMGI for group service G1.

Since the user of the mobile communication device 3-1 is interested in the group service G1, the mobile communication device 3-1 generates (using its D2D module 48) and sends, at step S807, an appropriately formatted signalling message to the core network 7/MME 11 (via the UE-R 3-2 and the base station 5 using the network connection established at S805), requesting the MME 11 to set up a D2D bearer for group service related communications associated with group G1. In this example, the signalling message at S807 (e.g. a 'D2D bearer request' signalling message) includes information identifying the group service G1 by its specific TMGI. The mobile communication device 3-1 may also include in this signalling message (or in a different signalling message, e.g. at S805) information identifying the UE-R 3-2 via which the mobile communication device 3-1 can be reached, although it will be appreciated that the base station 5/MME 11 can also identify the UE-R 3-2 by virtue of the UE-R 3-2 relaying the mobile communication device's 3-1 communications.

At step S808, a core network entity (e.g. the MME 11) receives the mobile communication device's 3-1 D2D request for creating/setting up a D2D bearer and determines that the message includes a parameter identifying the requested group service (in this case a TMGI and/or IP multicast address associated with the group service 'G1').

Next, the MME 11 generates (using its UE-R configuration module 69) and sends, at step S810, an appropriately formatted signalling message to the base station 5 (e.g. an 'E-RAB setup request' message) requesting the base station 5 to configure the radio bearer used by the UE-R 3-2 (and/or to create a new D2D bearer) for receipt (and relaying) of communications associated with the identified group service. The signalling message by the MME 11 identifies the group service requested by the mobile communication device 3-1, in this example, by including the TMGI and/or IP multicast address associated with the group service 'G1'.

Upon receiving the MME's 11 request for configuring the UE-Relay's radio bearer for receipt (and relaying) of group service communications, the base station 5 proceeds to configure the UE-R 3-2 by generating and sending, at step S811, an appropriately formatted signalling message (e.g. an RRC Connection Reconfiguration' message) to the UE-R 3-2. The base station 5 also includes in this signalling message the specific parameters (e.g. the TMGI and/or IP multicast address associated with the group service 'G1') that allow the UE-R 3-2 to relay group service communications for the relayed mobile communication device 3-1.

In response to receiving the base station's 5 signalling message sent at S811, the UE-R 3-2 configures its mapping module 49 (and/or its duplication box 50) for mapping the information identifying the group service G1 (e.g. its associated TMGIs provided by the TMGI module 46) to the correct D2D bearer(s) using the D2D TFTs (provided by the device-to-device module 48) for the mobile communication device 3-1. This is generally illustrated in step S812.

Next, as generally illustrated in step S813, the mobile communication device 3-1 and the core network 7 (and the UE-R 3-2 provided between them) complete the D2D bearer (pre-)establishment procedure (corresponding to the D2D bearer request sent at S807). At step S815, the MME 11 determines that activation of the D2D bearer between the UE-R 3-2 and the mobile communication device 3-1 is complete.

The D2D bearer is now available for relaying broadcast/multicast (e.g. eMBMS) data from the base station 5 via the UE-R 3-2 to the mobile communication device 3-1 (and vice versa) with respect to each group service (in this case, G1) that the mobile communication device 3-1 is interested in—although at this phase the mobile communication device 3-1 might not have informed the GCSE AS 16 about any such interest yet.

The mobile communication device 3-1 generates (using its communication control module 43) and sends, at step S817, an appropriately formatted signalling message to the GCSE AS 16, requesting the GCSE AS 16 to register the mobile communication device 3-1 for communications using the group service G1. The mobile communication device 3-1 includes in this signalling message an indication that broadcast/multicast services (e.g. eMBMS) for the requested group service (G1) are available for this mobile communication device 3-1. If the mobile communication device 3-1 has previously registered for this group service with the GCSE AS 16 (e.g. whilst being connected to a base station or to another UE-R), this message informs the GCSE AS 16 that the mobile communication device 3-1 is reachable again and serves to update any previous information held by the GCSE AS 16 about the mobile communication device 3-1.

Next, at step S819, the GCSE AS 16 updates its GCSE module 85 (with information that 'UE1' is registered for service 'G1') and path selection module 87 (with information that 'UE1' can receive data via broadcast/multicast) according to the information included in the message received at S817.

As generally illustrated at step S821, if there is data to be sent to the members/subscribers of group G1, the GCSE AS 16 can send the data to the base station 5 (via the BM-SC 15 and the core network 7) without the GCSE AS 16 having to set up (or use) a dedicated unicast bearer with respect to the mobile communication device 3-1, because the GCSE AS 16 has been notified that the mobile communication device 3-1 is able to receive group services using broadcast/multicast signalling (relayed via the UE-R 3-2). The base station 5 transmits the data associated with group services (in this case, talk burst data for group G1) within its coverage as specified by the BM-SC 15 (e.g. according to a desired synchronisation with other base stations), which is then received by the UE-R 3-2 served by the base station 5.

Since the UE-R 3-2 was set up (at S812) for forwarding any data associated with group service G1 to the mobile communication device 3-1, the UE-R 3-2 proceeds to identify (using its mapping module 49) any D2D bearer associated with the mobile communication device 3-1 using the D2D TFT(s) (which map the information (e.g. TMGI)

identifying group service G1 to the corresponding D2D bearer(s)). The UE-R 3-2 then relays (e.g. using its D2D module 48 and/or its duplication box 50) the received talk burst data of group G1 to the mobile communication device 3-1 over the identified D2D bearer associated with that mobile communication device 3-1. If any further mobile communication device (e.g. mobile communication device 3-3 or the UE-R 3-2) is also interested in the group service G1, the UE-R 3-2 also transmits the talk burst data of group G1 to those mobile communication devices as well (e.g. its duplication box 50 duplicating the talk burst data if necessary) over their associated D2D bearers.

Whenever there is any further data to send to the members of group service G1, steps S821 to S823 may be repeated, at least until such group communications to the mobile communication device 3-1 are prevented (e.g. due to the mobile communication device 3-1 no longer being a member of (interested in) group service G1, the mobile communication device 3-1 no longer being connected to the UE-R 3-2, and/or the UE-R 3-2 no longer being within the coverage of the base station 5). It will be appreciated that when multiple relayed mobile communication devices connected to the UE-R 3-2 (e.g. both UE-1 and UE-3) are interested in receiving the G1 group service, step S823 may be performed only once (rather than separately for each relayed mobile communication device), using an appropriately configured (e.g. point-to-multipoint and/or multicast) D2D bearer provided between the UE-R 3-2 and each relayed mobile communication device.

Advantageously, in this example, there is no need for the GCSE AS 16 to implement the functionality for configuring the UE-R 3-2 for forwarding group service data to the mobile communication device 3-1. Accordingly, the corresponding UE-R configuration module 89 (of the GCSE AS 16) is not required.

Operation—Configuration by the GCSE AS

Figure 9:
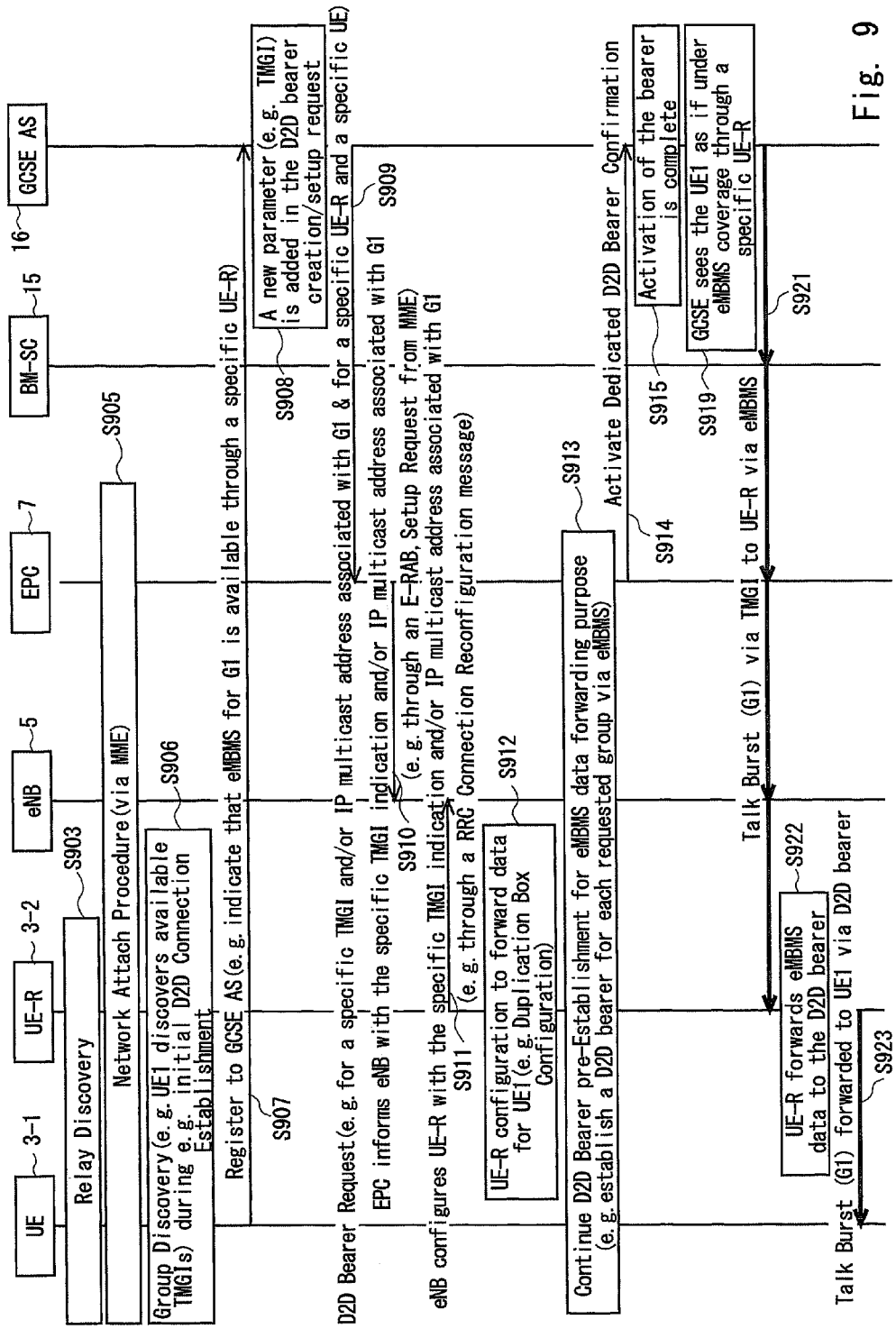
FIG. 9 is a timing diagram illustrating yet another exemplary way in which multimedia broadcast/multicast services are realised using a mobile communication device forming part of the system shown in FIG. 1.

FIG. 9 is a timing diagram illustrating yet another exemplary way in which multimedia broadcast/multicast services are realised using a relaying mobile communication device 3-2 forming part of the system 1 shown in FIG. 1. In this example, the UE-R is configured, for forwarding group service communications, by the GCSE AS 16.

Initially, the second mobile communication device 3-2 is set up as a UE-R (although there may not be any user equipment connected to it yet) and the mobile communication device 3-2 (e.g. whilst within MBMS coverage), using its TMGI module 46, discovers identifiers of group services (e.g. 'G1') provided in the network (in a similar manner as described above with reference to step S701 of FIG. 7).

Steps S903 to S906 correspond to steps S803 to S806, respectively, their description is therefore omitted.

Since the user of the mobile communication device 3-1 is interested in a group service (in this example group service 'G1'), the mobile communication device 3-1 generates (using its D2D module 48) and sends, at step S907, an appropriately formatted signalling message to the GCSE AS 16 (via the UE-R 3-2, the base station 5, and the core network 7), requesting the GCSE AS 16 to register the mobile communication device 3-1 for the identified group service (G1).

In this example, the mobile communication device 3-1 includes in the signalling message sent at S907 information identifying the group service G1 (e.g. a specific TMGI associated with the group service G1) and information identifying the UE-R 3-2 via which the mobile communication device 3-1 can be reached.

At step S908, the GCSE AS 16 receives the mobile communication device's 3-1 registration request and determines that the received message includes a parameter identifying a group service (in this case a TMGI associated with the group service 'G1') provided by the GCSE AS 16. The GCSE AS 16 generates (using its UE-R configuration module 89) and sends, at step S909, an appropriately formatted signalling message to the core network 7 (e.g. to the MME 11) requesting the core network 7 to set up a D2D bearer between the mobile communication device 3-1 and the UE-R 3-2 for relaying group service related communications associated with the group G1. In this example, the signalling message at S909 (e.g. a 'D2D bearer request' signalling message) includes information identifying the group service G1 by e.g. its associated TMGI, IP multicast address, and/or the like.

Next, the MME 11 generates (using its UE-R configuration module 69) and sends, at step S910, an appropriately formatted signalling message to the base station 5 (e.g. an 'E-RAB setup request' message) requesting the base station 5 to configure the radio bearer used by the UE-R 3-2 (and/or to create a new D2D bearer) for receipt (and relaying) of communications associated with the identified group service. The signalling message by the MME 11 identifies the group service requested by the mobile communication device 3-1, in this example, by including the TMGI and/or multicast address associated with the group service 'G1', as received from the GCSE AS 16 at S909.

Upon receiving the MME's 11 request for configuring the UE-Relay's radio bearer for receipt (and relaying) of group service communications, the base station 5 proceeds to configure the UE-R 3-2 by generating and sending, at step S911, an appropriately formatted signalling message (e.g. an RRC Connection Reconfiguration' message) to the UE-R 3-2. The base station 5 also includes in this signalling message the specific parameters (e.g. the TMGI and/or multicast address associated with the group service 'G1') that allow the UE-R 3-2 to relay group service communications for the relayed mobile communication device 3-1.

In response to receiving the base station's 5 signalling message sent at S911 (which include the parameters from the GCSE AS 16), the UE-R 3-2 configures its mapping module 49 (and/or its duplication box 50) for mapping the information identifying the group service G1 (e.g. its associated TMGIs provided by the TMGI module 46) to the correct D2D bearer(s) using the D2D TFTs (provided by the device-to-device module 48) for the mobile communication device 3-1. This is generally illustrated in step S912.

Next, as generally illustrated in step S913, the mobile communication device 3-1 and the core network 7 (and the UE-R 3-2 provided between them) complete the D2D bearer (pre-)establishment procedure (corresponding to the D2D bearer request sent at S909).

At step S914, the core network 7 (e.g. the MME 11) sends a confirmation to the GSCE AS 16 that the requested D2D bearer (between the mobile communication device 3-1 and the UE-R 3-2) has been set up. At step S915, the GCSE AS 16 determines that activation of the end-to-end bearer for the mobile communication device 3-1 (which includes the D2D bearer between the UE-R 3-2 and the mobile communication device 3-1) is complete. The GCSE AS 16 also determines, at step S919, that a broadcast/multicast bearer (e.g. eMBMS) can be used for the mobile communication device 3-1 (via the UE-R 3-2) with respect to each group service (in this case, G1) that the mobile communication device 3-1 is interested in (as indicated by the message at S907). The GCSE AS 16 also updates its GCSE module 85 (with information that 'UE1' is registered for service 'G1') and path selection module 87 (with information that 'UE1' can receive data via broadcast/multicast).

As generally illustrated at step S921, if there is data to be sent to the members/subscribers of group G1, the GCSE AS 16 can send the data to the base station 5 (via the BM-SC 15 and the core network 7) without the GCSE AS 16 having to set up (or use) a dedicated unicast bearer with respect to the mobile communication device 3-1, because the GCSE AS 16 has been notified that the mobile communication device 3-1 is able to receive group services using broadcast/multicast signalling (relayed via the UE-R 3-2). The base station 5 transmits the data associated with group services (in this case, talk burst data for group G1) within its coverage as specified by the BM-SC 15 (e.g. according to a desired synchronisation with other base stations), which is then received by the UE-R 3-2 served by the base station 5.

Since the UE-R 3-2 was set up (at S912) for forwarding any data associated with group service G1 to the mobile communication device 3-1, the UE-R 3-2 proceeds to identify (using its mapping module 49) any D2D bearer associated with the mobile communication device 3-1 using the D2D TFT(s) (which map the information (e.g. TMGI) identifying group service G1 to the corresponding D2D bearer(s)). The UE-R 3-2 then relays (e.g. using its D2D module 48 and/or its duplication box 50) the received talk burst data of group G1 to the mobile communication device 3-1 over the identified D2D bearer associated with that mobile communication device 3-1. If any further mobile communication device (e.g. mobile communication device 3-3 or the UE-R 3-2) is also interested in the group service G1, the UE-R 3-2 also transmits the talk burst data of group G1 to those mobile communication devices as well (e.g. its duplication box 50 duplicating the talk burst data if necessary) over their associated D2D bearers.

Whenever there is any further data to send to the members of group service G1, steps S921 to S923 may be repeated, at least until such group communications to the mobile communication device 3-1 are prevented (e.g. due to the mobile communication device 3-1 no longer being a member of (interested in) group service G1, the mobile communication device 3-1 no longer being connected to the UE-R 3-2, and/or the UE-R 3-2 no longer being within the coverage of the base station 5). It will be appreciated that when multiple relayed mobile communication devices connected to the UE-R 3-2 (e.g. both UE-1 and UE-3) are interested in receiving the G1 group service, step S923 may be performed only once (rather than separately for each relayed mobile communication device), using an appropriately configured (e.g. point-to-multipoint and/or multicast) D2D bearer provided between the UE-R 3-2 and each relayed mobile communication device.

Advantageously, in this example, there is no need for the MME 11 to implement the functionality for configuring the UE-R 3-2 for forwarding group service data to the mobile communication device 3-1. Accordingly, the corresponding UE-R configuration module 69 (of the MME 11) is not required.

End-to-End Service Architecture

Figure 10:
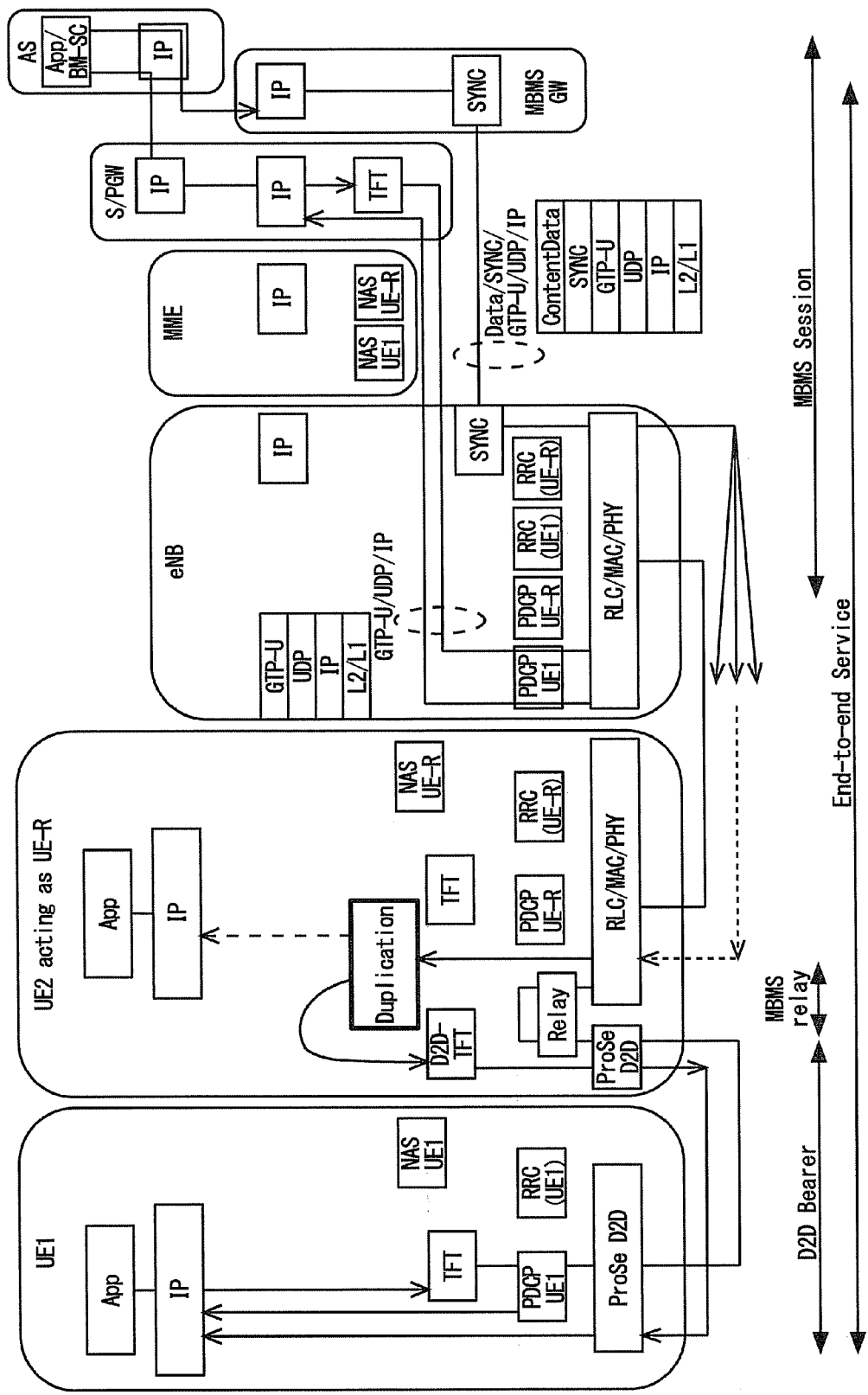
FIG. 10 illustrates schematically an exemplary user plane architecture for providing an end-to-end service using an MBMS bearer and a D2D bearer.

FIG. 10 illustrates schematically an exemplary user plane architecture for providing an end-to-end service using an MBMS bearer and a D2D bearer. In this example, the user plane architecture involves a unicast D2D bearer between the UE-R 3-2 and the relayed mobile communication device 3-1 (denoted 'UE1' in FIG. 10).

If this architecture is used, the GCSE AS 16 (via the BM-SC 15 and MBMS GW 12) can provide an MBMS session for a given group (e.g. G1) over a predefined area (e.g. an MBSFN area) which, in this example, includes the base station 5 (denoted 'eNB' in FIG. 10) serving the UE-R 3-2. The group 'G1' may be identified by a suitable group ID, such as an associated TMGI and/or the like.

After the mobile communication device 3-1 discovered and connected to the UE-R 3-2 (or any other mobile communication device configured as a relay) for receiving the group service G1 (e.g. as described with reference to step S703/S803/S903), it performs a network attachment procedure (e.g. at S715/S805/S905), and thereby creates an EPS bearer to the core network 7 for communicating with the GCSE AS 16. As a result, an end-to-end service can be provided between the mobile communication device 3-1 and the GCSE AS 16 (denoted 'AS' in FIG. 10), albeit using a unicast bearer only.

Next, the mobile communication device 3-1 indicates to the GCSE AS 16 that it is interested in receiving the group service G1 (e.g. at S717/S817/S907) over (e)MBMS. If the mobile communication device 3-1 also indicates (e.g. at S907) to the GCSE AS 16 that it is currently served by another mobile communication device 3-2 acting as UE-R (rather than a base station 5), the GCSE AS 16 requests the MME 11 (e.g. at S909) that a suitable D2D Bearer be set up between the UE-R 3-2 and the mobile communication device 3-1. In other examples (e.g. as illustrated in FIGS. 7 and 8) the D2D bearer may be requested by the mobile communication device 3-1 itself (e.g. at S707/S807). Where appropriate, the GCSE AS 16 also requests the MME 11 to configure (e)MBMS traffic duplication for the UE-R 3-2 towards the mobile communication device 3-1 (e.g. in case the same group service G1 is provided to at least one (or more) mobile communication device 3 via the UE-R 3-2), although such duplication may be configured by the UE-R 3-2 autonomously (e.g. at S612).

Figure 11:
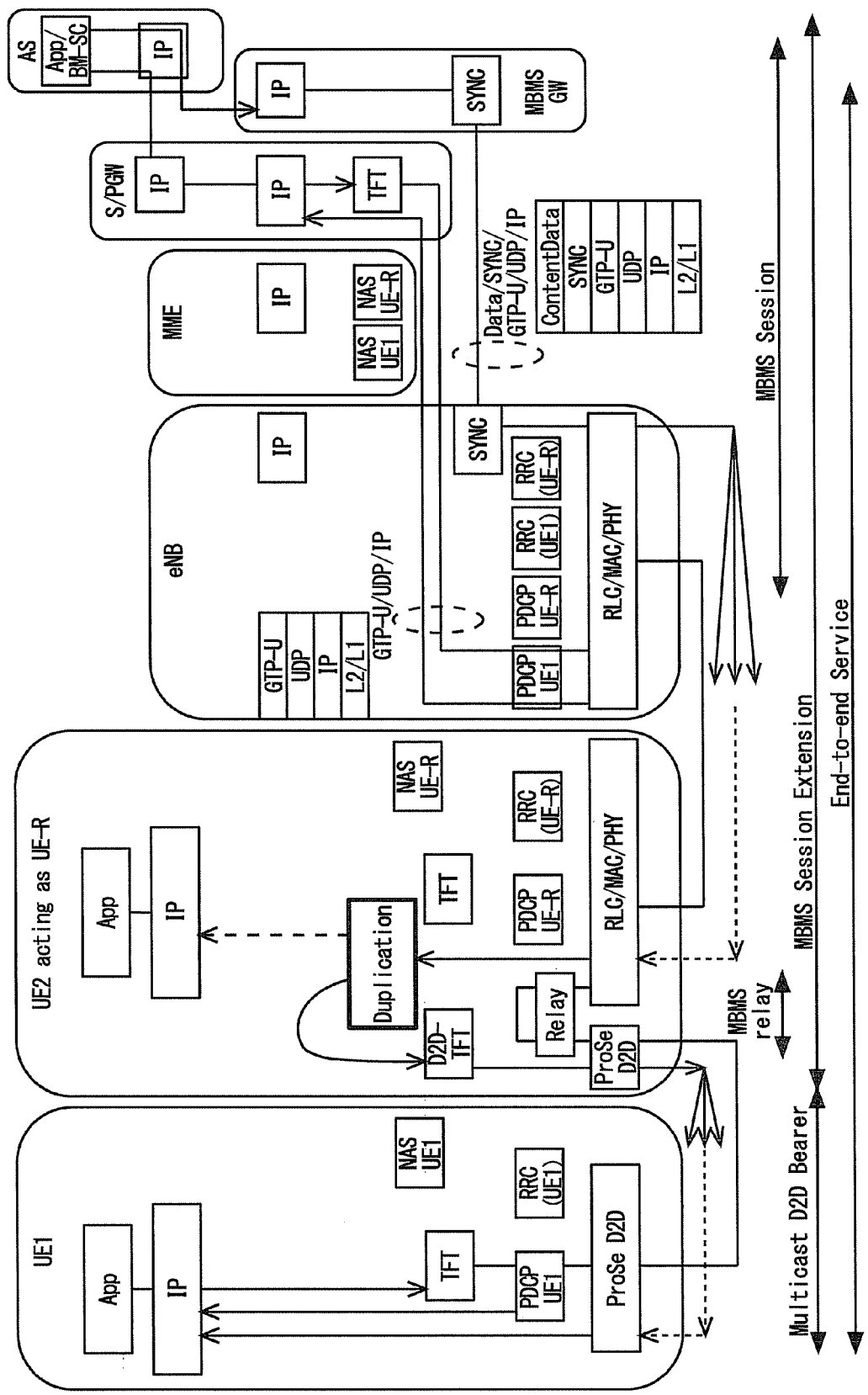
FIG. 11 illustrates schematically an exemplary user plane architecture for providing an end-to-end service using an MBMS bearer and a multicast D2D bearer.

FIG. 11 illustrates schematically an exemplary user plane architecture for providing an end-to-end service using an MBMS bearer and a multicast D2D bearer. In this example, the user plane architecture involves a multicast D2D bearer between the UE-R 3-2 and the relayed mobile communication device 3-1 (and possibly other mobile communication devices receiving the same group service/data).

Similarly to the previous example, if the architecture of FIG. 11 is used, the GCSE AS 16 (via the BM-SC 15) can provide an MBMS session for a given group (e.g. G1/TMGI) over a predefined (MBSFN) area which, in this example, includes the base station 5 serving the UE-R 3-2.

However, in this example, the GCSE AS 16 requests the MME 11 (e.g. at S909) to extend, at least with respect to the group service G1, the (e)MBMS bearer (currently terminating at the UE-R 3-2) to the relayed mobile communication device 3-1 using a suitable multicast bearer between the UE-R 3-2 and the mobile communication device(s) 3 served by the UE-R 3-2. Thus, the MME 11 initiates (e.g. at S910) the setting up of a suitable multicast bearer between the UE-R 3-2 and the mobile communication device(s) 3 served by the UE-R 3-2 (e.g. over the respective D2D connection(s) provided between them and/or using broadcast signalling). In this case, security may be provided at the ProSe D2D layer and/or at the application layer. Beneficially, a multicast bearer provided between a plurality of mobile communication devices makes it possible for the mobile communication devices to receive, concurrently, the same group service if they share the same security settings (e.g. use the same password at the application level) for that group service/multicast bearer.

Modifications and Alternatives

Detailed embodiments have been described above. As those skilled in the art will appreciate, a number of modifications and alternatives can be made to the above embodiments whilst still benefiting from the inventions embodied therein. By way of illustration only a number of these alternatives and modifications will now be described.

In the above examples, the mobile communication devices perform a discovery procedure in order to establish a D2D connection with each other. It will be appreciated that the mobile communication devices may realise such a discovery procedure by communicating any suitable messages to each other, e.g. by communicating system information broadcast (SIB) messages, master information block (MIB) messages, information exchange messages, messages forming part of a request/reply-based mechanism, and/or the like. Further, it will be appreciated that the mobile communication devices, as part of such a discovery procedure, may also discover any TMGIs/services available in the network (e.g. when one of the mobile communication devices is configured as a UE-R).

In the above examples, two mobile communication devices were allowed to establish a direct D2D connection with each other. As those skilled in the art will appreciate, such connections may be established between three or more mobile communication devices, such that the users of the mobile communication devices may be connected together in a conference call setup. In this case, a D2D bearer may be provided between three or more mobile communication devices (e.g. all mobile communication devices interested in a particular group service via the same UE-R).

It will be appreciated that a D2D TFT may filter multiple D2D bearers destined to the same mobile communication device and/or to different mobile communication devices.

In the above description, a D2D bearer is being set up between the relaying mobile communication device and the relayed mobile communication device(s) for relaying group service data. It will be appreciated that such a 'D2D bearer' may comprise at least one of: a D2D radio bearer; a D2D EPS bearer; a D2D service bearer; and/or the like.

In the above embodiments, the user equipment comprise mobile (cellular) communication devices. Other types of user devices such as, for example, mobile telephones, smartphones, personal digital assistants, laptop computers, web browsers, MTC (Machine Type Communication) devices, etc. could be used.

Whilst examples of the invention are illustrated using GCSE based group services (e.g. group communications and/or broadcast/multicast of multimedia content), the invention is also applicable to any group services and/or broadcast/multicast transmissions involving a UE-R.

In the above embodiments, group services are provided using MBMS and/or eMBMS technologies. However, it will be appreciated that other suitable technologies may also be used for broadcasting and/or multicasting group services data. Group services data may also be broadcast/multicast using a combination of more than one suitable technologies, e.g. both MBMS and eMBMS in parallel (e.g. for backward compatibility).

Although in the above embodiments, for ease of understanding, broadcast/multicast communications take place using a single base station, it will be appreciated that several base stations may transmit (e.g. per instructions by the BM-SC) the group service data at the same time to any number of mobile communication device(s)/UE-R(s) in the network.

In the above embodiments, the UE-R relays (group services related) broadcast/multicast communications for a single mobile communication device. However, it will be appreciated that the UE-R may have multiple connections with several UEs at the same time and/or the UE-R may relay (the same or different) broadcast/multicast communications for a plurality of mobile communication devices.

In the above description, the GCSE module 45 is described to obtain an association between groups/services and their respective identifiers (TMGIs) from the GCSE application server 16. However, it will be appreciated that the GCSE module 45 may obtain such association from a different network entity (and/or from another mobile communication device). It will also be appreciated that a correspondence between groups/services and their respective identifiers (TMGIs) may be preconfigured (and stored in advance) in the UE-R rather than communicated on the application level.

In the above description, a GCSE module is optional in the UE-R. Accordingly, in steps S717, S817, and S907, the mobile communication device is described to send a 'Register' message to the GCSE AS transparently for the UE-R between them. However, it will also be appreciated that such a 'Register' message may be processed by the UE-R before forwarding to the GCSE AS, in which case the UE-R may also include a GCSE module, if appropriate. The UE-R may also include a GCSE module in order to provide group services to a user of the UE-R.

Further, it will be appreciated that the UE-R may relay data for other mobile communication devices regardless whether or not the relayed data is also destined for the UE-R (e.g. regardless whether or not a user operating the UE-R is using the service that the relayed data relates to).

In the above examples, the UE-R is described to relay service data relating to a single service (group service G1). However, it will be appreciated that the UE-R may relay service data for a plurality of services/groups. Further, the UE-R may relay service data, to each relayed mobile communication device, from the same or from different MBMS sessions/transmissions/bearers.

It will be appreciated that the network may control and/or identify and/or configure the UE-R and/or the mobile communication device 3-1 using their associated identities (including an identification of the D2D bearer provided between them, e.g. a D2D link identifier associated with the UE-R and the mobile communication device 3-1).

In the above examples, relayed communication paths have been described to use an LTE technology (i.e. the same communication technology that is used between the base station and the relaying mobile communication device). However, it will be appreciated that a communication path may be relayed using any communication technology, for example, WLAN, Wi-Fi, FlashLinQ, WiMAX, Bluetooth, BLE, ZigBee, etc. (irrespective of the communication technology used between the base station and the relaying mobile communication device).

In the above examples, the UE-R is described to be initially listening to group services made available in the network. However, it will be appreciated that this is optional, and the UE-R may not be listening to groups services at all, and/or the UE-R may be listening to group services after it has discovered the other mobile communication device 3-1 to be relayed (e.g. upon request of the mobile communication device 3-1).

It will be appreciated that the network attach procedure described with reference to step S715 of FIG. 7 may be performed at any time after the relay discovery (S703) is complete, e.g. any time before/after (or during) the group discovery procedure (S706), any time before/after (or during) the UE-R configuration procedure (S712) but in any case before step S717. It will also be appreciated that step S715 may be omitted, in which case the mobile communication device 3-1 is not attached to the core network. In this case, the UE-R 3-2 may be configured to relay group services to the mobile communication device 3-1 without the mobile communication device 3-1 informing the GSCE AS about its interest in a particular service (although the UE-R 3-2 may still provide such an indication, if appropriate).

It will be appreciated that the D2D bearer request (by the mobile communication device 3-1 at S807 and/or by the GCSE AS 16 at S909) may also include an IP level parameter (e.g. a UDP port number and/or address level information) associated with the requested service in addition to (e)MBMS bearer identity (such as a TMGI and/or IP multicast address). In this case the MME/UE-R configures relaying with respect to the indicated IP level parameter only thus enabling the mobile communication device 3-1 to receive traffic only from a specific group, e.g. when traffic from multiple groups is sent through the same (e)MBMS bearer.

It will also be appreciated that multiple groups may be identified by a unique label, e.g. a single TMGI parameter and/or a single IP level parameter for a set of groups. This may be beneficial, for example, when the number of available TMGIs is limited and/or when the UE-R is configured to receive data flows for multiple groups that are to be relayed to one or more mobile communication devices.

It will be appreciated that the configuration of the UE-R (e.g. as described with reference to steps S712/S812/S912) may comprise exchanging multiple messages between the UE-R and the corresponding other entity (e.g. the mobile communication device 3-1/a core network entity/the GCSE AS) providing the configuration parameters. For example, the configuration of the UE-R's mapping module and the configuration of the associated D2D TFT may be carried out based on a common configuration message, or based on separate configuration messages.

It will be appreciated that the UE-R may have a TFT with the base station/core network for its own use and a separate TFT for D2D and/or relaying use. However, the UE-R may also have a single TFT for its own use and D2D/relaying use as well.

Further, it will be appreciated that the UE-R may include one or more D2D TFT(s) in any of its modules, for example, in the D2D module 48, the mapping module 49, the duplication box 50, and/or the communication control module 43 (e.g. when a single TFT, such as a legacy TFT of the UE-R, provides the functionalities of both a D2D TFT and a UE-R TFT).

In the above description of the UE-R, the mapping module is described to include a 'duplication box' portion to perform duplication of the relayed data, when needed. However, it will be appreciated that the functionality of the duplication box may be provided via a separate module (e.g. a duplication module) and/or may be provided by the D2D module instead. It will also be appreciated that in some examples the mapping module and the D2D module may be combined as a single (physical and/or functional) module.

In the above description of FIGS. 7 to 9, specific signalling messages were given as examples (e.g. 'D2D bearer setup' messages, 'E-RAB Setup Request' messages, and 'RRC Connection Reconfiguration' messages). However, it will be appreciated that different signalling messages may also be used, for example any suitable Access Stratum (AS) and/or Non-Access Stratum (NAS) messages and/or non-3GPP messages.

In the above examples, the D2D bearer is directly created by the UE-R and the mobile communication device 3-1 without any information from the NW. In other examples however, the D2D bearer may be created with the assistance of a core network entity (e.g. the MME). For example, the MME may provide a unique D2D bearer identity to (the D2D module of) the UE-R to be associated with the mobile communication device 3-1.

Regarding the exemplary D2D bearer architectures illustrated in FIGS. 10 and 11, it will be appreciated that there may be an end-to-end Packet Data Convergence Protocol (PDCP) connection provided between the mobile communication device 3-1 and the UE-R 3-2 (in accordance with 3GPP TS 25.323). In this case, a PDCP functionality may also be included in both the mobile communication device 3-1 and the UE-R 3-2 (e.g. as an upper layer with respect to the ProSe D2D layer). However, it will be appreciated that it is not necessary to provide such a PDCP connection between the mobile communication device 3-1 and UE-R 3-2. Instead (or in addition), a security functionality may be included in both the mobile communication device 3-1 and the UE-R 3-2 in an upper layer (e.g. the application layer). It will also be appreciated that a security functionality may also be included directly in the ProSe D2D layer.

When a mobile communication device that is already receiving group traffic via a D2D bearer decides to leave a group, it may send a message to the UE-R in order to delete the corresponding D2D bearer(s). In this case, it will be appreciated that upon receiving this message, the UE-R may delete any TFT filter (and/or information) associating the D2D bearer(s) to the mobile communication device leaving the group. The UE-R may also remove any entry from its mapping module associated with the group (and/or terminate any associated duplication of data), in case there are no remaining UEs listening to this group via the UE-R.

Further, it will be appreciated that when the UE-R determines that a mobile communication device is no longer connected (e.g. the UE went out of coverage or performed a handover to another UE-Relay or a base station), the UE-R may update its TFT filter(s) and/or mapping module for each group (and for each D2D bearer) associated with the mobile communication device that is no longer connected to the UE-R.

Moreover, when the UE-R loses (e)MBMS coverage for a given group, it may notify the mobile communication device(s) to which traffic for this group was forwarded via D2D bearer(s) and/or delete any D2D bearers using which traffic for that group was forwarded. In this case, the UE-R may also inform/involve the MME about the loss of (e)MBMS and/or deletion of associated D2D bearers so that the core network has up-to-date information on the provision of group services (e.g. for appropriate charging, load balancing, switching to unicast bearer(s), and/or the like).

In the above example, the mobile communication device informs the GCSE AS about the availability of (e)MBMS (and the mobile communication device's interest in a particular service) by sending an application-level message (e.g. a "Register" message as described with reference to steps S717, S817, or S907). However, it will also be appreciated that the mobile communication device (or the UE-R) may inform the GCSE AS about the availability of (e)MBMS using any suitable messages, e.g. location reporting messages (which may be sent, for example, in response to an appropriate request by the GCSE AS). In this case, the GCSE AS may work out from the received location reporting message(s) whether the mobile communication device/the UE-R is currently located within a cell that provides (e)MBMS, and the GCSE AS may adjust its operation accordingly (i.e. determine whether to use a broadcast/multicast or unicast bearer).

It will also be appreciated that the base station (and/or the UE-R) may comprise a Low Power Node (LPN), such as a home base station, a femto base station, and/or the like.

It will be appreciated that the above described messages (e.g. the 'D2D bearer request' messages and/or the 'Register' messages sent to the GCSE AS) may comprise any suitable 3GPP messages, such as RRC messages (for communicating with the base station), NAS messages (for communicating with the MME), Physical Uplink Control Channel (PUCCH) messages, Physical Uplink Shared Channel (PUSCH) messages, and/or the like.

In the above description, steps S810 and S910 have been described to configure E-RAB parameters for a new (D2D) bearer to be established for relaying group service communications. Accordingly, appropriately formatted 'E-RAB Setup Request' messages have been given at steps S810 and S910, purely as examples. However, it will be appreciated that the E-RAB messages at steps S810 and/or S910 may comprise one or more E-RAB Modify Request message(s) (e.g. when modifying the E-RAB parameters for an already established bearer).

Although not shown in the figures, it will be appreciated that the base station may send an appropriate reply to the MME's E-RAB message received at step S810/S910. For example, the base station may send an 'E-RAB Setup Response' message to the MME, if appropriate (e.g. in response to a preceding E-RAB Setup Request, thereby acknowledging the reception/configuration of E-RAB parameters for a new bearer). The base station may also send an 'E-RAB Modify Response' to the MME, if appropriate (e.g. in response to a preceding 'E-RAB Modify Request', thereby acknowledging the reception/configuration of E-RAB parameters for an already established bearer).

It will be appreciated that the signalling message sent at step S810/S910 (e.g. an E-RAB Setup Request message and/or an E-RAB Modify Request message) might include e.g. a NAS protocol data unit (PDU) comprising a 'Modify EPS Bearer Context Request' message or an 'Activate Dedicated EPS Bearer Request' message. It will be appreciated that in some examples the configuration parameters (e.g. TMGI and/or IP multicast address and/or D2D bearer identity) may be included in such a (NAS) PDU.

It will also be appreciated that when the base station attempts to reconfigure the RRC connection for the UE-R (at step S811/S911), the UE-R may send a confirmation message to the MME to confirm the modification of the EPS bearer (as a consequence of the RRC connection reconfiguration). It will be appreciated that the confirmation by the UE-R may comprise a NAS signalling message, e.g. an 'Activate Dedicated EPS Bearer Context Accept' NAS message/'Activate Dedicated EPS Bearer Confirmation' NAS message (to confirm the activation of a new EPS bearer) or a 'Modify EPS Bearer Context Accept' message/'Modify EPS Bearer Confirmation' message (to confirm modification of an existing EPS bearer).

It will be appreciated that some messages may be sent from/to the network at the same time (e.g. combined) and/or messages may be sent at different times, and in a different order than they are presented above.

In FIGS. 10 and 11 a 'PDCP' layer is shown at the base station and the mobile communication devices. However, it will be appreciated that some of the conventional PDCP functionalities may not be required. For example, an Robust Header Compression (ROHC) function and/or a security function may not be used/implemented by the entities shown having a 'PDCP' layer.

It will also be appreciated that a D2D (or ProSe) capable UE may have multiple connections with other UEs, UE-Rs, and/or other D2D UEs, if appropriate. For example, it will be appreciated that a multicast bearer may be provided between a plurality of UE-Rs and a single relayed mobile communication device (or between a plurality of UE-Rs and a plurality of mobile communication devices).

The above examples have been discussed with reference to UE-R technology. However, it will be appreciated that the examples are also applicable to other fields such as D2D (Device-to-Device), P2P (Peer-to-Peer), and/or P2M (Peer-to-Multipeer) technologies. In the above description, the UE-R is described as a standalone entity. However, it will be appreciated that the UE-R functionality described above may be implemented using multiple entities. For example, the UE-R functionality may be provided by a plurality of mobile communication devices connected in a hop-by-hop manner to a base station, using respective D2D/ProSe connections to provide each 'hop' between two neighbour mobile communication devices. It will also be appreciated that the UE-R may be provided in the form of an apparatus, e.g. as a mobile communication device connected to a wireless router, laptop computer, and/or the like.

In the above description, the relaying mobile communication device, the mobility management entity, and the group communication system enablers application server are described for ease of understanding as having a number of discrete functional components or modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

In the above embodiments, a number of software modules were described. As those skilled in the art will appreciate, the software modules may be provided in compiled or un-compiled form and may be supplied to the relaying mobile communication device, the mobility management entity, and the group communication system enablers application server as a signal over a computer network, or on a recording medium. Further, the functionality performed by part or all of this software may be performed using one or more dedicated hardware circuits. However, the use of software modules is preferred as it facilitates the updating of the relaying mobile communication device, the mobility management entity, and the group communication system enablers application server in order to update their functionalities.

Various other modifications will be apparent to those skilled in the art and will not be described in further detail here.

GLOSSARY OF 3GPP TERMS
BM-SC—Broadcast Multicast Service Center
D2D—Device to Device
eNB—Evolved NodeB, E-UTRAN base station
EPC—Evolved Packet Core
EPS—Evolved Packet System
E-UTRA—Evolved UMTS Terrestrial Radio Access
E-UTRAN—Evolved UMTS Terrestrial Radio Access Network GCSE AS—Group Communication System Enablers Application Server
HSS—Home Subscriber Server
LTE—Long Term Evolution (of UTRAN)
MBMS—Multimedia Broadcast/Multicast Service
MBMS GW—MBMS Gateway
MCE—Multi-cell/multicast Coordination Entity
MME—Mobility Management Entity
NAS—Non-Access-Stratum
OAM—Operation And Maintenance
PCRF—Policy and Charging Rules Function
PDCP—Packet Data Convergence Protocol
P-GW—PDN Gateway
ProSe—Proximity-based Services
(E-)RAB—(EPS-) Radio Access Bearer
RRC—Radio Resource Control
S1-MME—S1 for the control plane
S1-U—S1 for the user plane
S-GW—Serving Gateway
TFT—Traffic Flow Template
TMGI—Temporary Mobile Group Identity
UE—User Equipment
UE-R—UE Relay
UMTS—Universal Mobile Telecommunications System The above-mentioned processing may be executed by a computer. Also, it is possible to provide a computer program which causes a programmable computer device to execute the above-mentioned processing. The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM, CD-R, CD-R/W, and semiconductor memories (such as mask ROM, PROM (Programmable ROM), EPROM (Erasable PROM), flash ROM, RAM (Random Access Memory), etc.). The software modules may be provided to a computer using any type of transitory computer readable media. Examples of transitory computer readable media include electric signals, optical signals, and electromagnetic waves. Transitory computer readable media can provide the software modules to a computer via a wired communication line (e.g. electric wires, and optical fibers) or a wireless communication line.

This application is based upon and claims the benefit of priority from United Kingdom Patent Application No. 1319196.0, filed on Oct. 30, 2013.

[REFERENCE SIGNS LIST]
1 SYSTEM
3-1 TO 3-3 USER EQUIPMENT (MOBILE COMMUNICATION DEVICES)
4 BASE STATION
7 CORE NETWORK
10 EXTERNAL NETWORK
11 MME
12 MBMS GW
13 SERVING GATEWAY (S-GW)
14 PACKET DATA NETWORK (PDN) GATEWAY (P-GW)
15 BROADCAST/MULTICAST SERVICE CENTER (BM-SC)
16 GROUP COMMUNICATION SYSTEM ENABLER (GCSE) HAVING AN ASSOCIATED APPLICATION SERVER (GCSE AS)
31 TRANSCEIVER CIRCUIT
33 ANTENNA
35 USER INTERFACE
37 CONTROLLER
39 MEMORY
41 OPERATING SYSTEM
43 COMMUNICATION CONTROL MODULE
45 GCSE MODULE
46 TMGI MODULE
47 MULTIMEDIA BROADCAST/MULTICAST SERVICES (MBMS) MODULE
48 DEVICE-TO-DEVICE (D2D) MODULE
49 MAPPING MODULE
50 DUPLICATION BOX
51 TRANSCEIVER CIRCUIT
55 NETWORK INTERFACE
57 CONTROLLER
59 MEMORY
61 OPERATING SYSTEM
63 COMMUNICATION CONTROL MODULE
67 THE BEARER CONTROL MODULE
69 UE-R CONFIGURATION MODULE
71 TRANSCEIVER CIRCUIT
75 NETWORK INTERFACE
77 CONTROLLER
79 MEMORY
81 OPERATING SYSTEM
83 COMMUNICATION CONTROL MODULE
85 GCSE MODULE
87 PATH SELECTION MODULE
89 UE-R CONFIGURATION MODULE

The invention claimed is:

1. A communication device in a communication network, the communication device comprising:
a controller and a transceiver wherein said transceiver is configured to communicate with a base station and with at least one user equipment UE, wherein said communication unit transceiver is configured to:
i) communicate with the base station over a first interface;
ii) communicate with the at least one UE over a second interface;
iii) receive, from the at least one UE, via the second interfaces interface, a temporary mobile group identity, TMGI, for receiving related eMBMS (Enhanced Multimedia Broadcast/Multicast Service) content; and
iv) receive, via said first interface. eMBMS traffic related to the TMGI; and wherein said controller is configured to:
maintain, for each service identified the eMBMS related to the TMGI, information identifying a link to the at least one UE that is interested in receiving that service; and
control the transceiver to forward the eMBMS traffic related to the TMGI to the at least on UE over the link identified by the maintained information.

2. The communication device according to claim 1, wherein said information identifying a link comprises information for identifying members of a group of UEs for which the eMBMS traffic is destined.

3. The communication device according to claim 1, wherein said communication device comprises a proximity-based services, ProSe, UE relay.

4. A method performed by a communication device for facilitating the provision of at least one service in a communication network, the communication device comprising a controller and a transceiver wherein said transceiver communicates: with a base station of said communication network over a first interface; and with a plurality of other communication devices over a second interface, the method comprising:
- communicating with the base station over the first interface;
- communicating with at least one UE (User Equipment) over the second interface; receiving, from the at least one UE, via the second interface, a temporary mobile group identity, TMGI, for receiving related eMBMS (Enhanced Multimedia Broadcast/Multicast Service) content;
- receiving, via said first interface, eMBMS traffic related to the TMGI;
- maintaining, for the eMBMS related to the TMGI, information identifying a link to the at least one UE; and
- forwarding the eMBMS traffic related to the TMGI to the at least one UE over the link identified by the maintained information.

5. A non-transitory computer storage medium storing a program comprising instructions for causing a computer-programmable device to perform a method according to claim 4.

* * * * *

UNITED STATES PATENT AND TRADEMARK OFFICE
CERTIFICATE OF CORRECTION

| | | |
|---|---|---|
| PATENT NO. | : 9,844,026 B2 | Page 1 of 2 |
| APPLICATION NO. | : 14/773995 | |
| DATED | : December 12, 2017 | |
| INVENTOR(S) | : Christophe Le Thierry D'Ennequin et al. | |

It is certified that error appears in the above-identified patent and that said Letters Patent is hereby corrected as shown below:

In the Claims

Column 38, Lines 33-55, (approx.), please correct Claim 1 to read as:
1. A communication device in a communication network, the communication device comprising:
    a controller and a transceiver wherein said transceiver is configured to communicate with a base station and with at least one user equipment UE, wherein said transceiver is configured to:
        i) communicate with the base station over a first interface;
        ii) communicate with the at least one UE over a second interface;
        iii) receive, from the at least one UE, via the second interfaces interface, a temporary mobile group identity, TMGI, for receiving related eMBMS (Enhanced Multimedia Broadcast/Multicast Service) content; and
        iv) receive, via said first interface, eMBMS traffic related to the TMGI; and wherein said controller is configured to:
    maintain, for the eMBMS traffic related to the TMGI, information identifying a link to the at least one UE that is interested in receiving that service; and
    control the transceiver to forward the eMBMS traffic related to the TMGI to the at least one UE over the link identified by the maintained information.

Column 38, Line 63-Column 39, Line 18, (approx.), please correct Claim 4 to read as:
4. A method performed by a communication device for facilitating a provision of at least one service in a communication network, the communication device comprising a controller and a transceiver wherein said transceiver communicates: with a base station of said communication network over a first interface; and with a plurality of other communication devices over a second interface, the method comprising:
    communicating with the base station over the first interface;
    communicating with at least one UE (User Equipment) over the second interface; receiving, from the at least one UE, via the second interface, a temporary mobile group identity, TMGI, for receiving related eMBMS (Enhanced Multimedia Broadcast/Multicast Service) content;
    receiving, via said first interface, eMBMS traffic related to the TMGI;

Signed and Sealed this
Nineteenth Day of June, 2018

Andrei Iancu
*Director of the United States Patent and Trademark Office* maintaining, for the eMBMS traffic related to the TMGI, information identifying a link to the at least one UE; and forwarding the eMBMS traffic related to the TMGI to the at least one UE over the link identified by the maintained information.